United States Patent
Zhang et al.

(10) Patent No.: US 6,936,794 B2
(45) Date of Patent: Aug. 30, 2005

(54) APPARATUS FOR CONTROLLING THE DRYING OF PREVIOUSLY BAKED GOODS

(75) Inventors: Hua Zhang, New Milford, CT (US); Mark A. Williamson, New Milford, CT (US); Eileen M. Roehr, Ridgefield, CT (US); Gary C. Helstern, Newtown, CT (US); J. Antonio Gutierrez, Kent, CT (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/691,660

(22) Filed: Oct. 24, 2003

(65) Prior Publication Data

US 2005/0087524 A1 Apr. 28, 2005

(51) Int. Cl.$^7$ ................................................. A21B 1/00
(52) U.S. Cl. ..................... 219/400; 219/385; 222/146.5
(58) Field of Search ............................... 219/214, 385, 219/400, 411, 494; 426/236, 524, 496; 222/146.5

(56) References Cited

U.S. PATENT DOCUMENTS

| | | | |
|---|---|---|---|
| 3,170,541 A | 2/1965 | Werner | 312/236 |
| 3,327,092 A | 6/1967 | Wilson | 219/214 |

(Continued)

FOREIGN PATENT DOCUMENTS

DE    148 293 A    5/1981

OTHER PUBLICATIONS

Wisco Industries, Brochure: Prepare Perfect Pizza & Snacks with Wisco Ovens & Warmers (6 pages) (Undated).
"Heated Merchandisers," Henny Penny Corporation (Apr., 1999) (6 pp).

*Primary Examiner*—Thor S. Campbell
(74) *Attorney, Agent, or Firm*—Winston & Strawn LLP

(57) ABSTRACT

A merchandiser for displaying and warming previously baked dough products, such as a filled pastry shell or other baked dough product, under controlled drying conditions, including an enclosure having one or more wall members that define an interior space, with at least a portion of one of the wall members being transparent, an opening for access into the interior space, a removable support member within the enclosure that includes at least one support surface for previously baked dough products and a spacing arrangement configured and adapted to reproducibly position the support member within the interior space of the enclosure member to facilitate substantially uniform airflow around each support surface and throughout the enclosure, and a heating system for providing heated air in the enclosure, wherein the substantially uniform airflow provides controlled drying of the previously baked dough products in the enclosure. A merchandiser including an air-moving device, a heat source, and a reflective device disposed therebetween is also included.

26 Claims, 8 Drawing Sheets

U.S. PATENT DOCUMENTS

| | | | |
|---|---|---|---|
| 3,632,968 A | 1/1972 | Wilson | 219/214 |
| 3,640,207 A | 2/1972 | Snyder | 99/327 |
| 4,135,369 A | 1/1979 | Allgeyer et al. | 62/251 |
| 4,664,921 A | 5/1987 | Seiden | 426/94 |
| 4,674,402 A | 6/1987 | Raufeisen | 219/400 |
| 4,752,484 A | 6/1988 | Pflaumer et al. | 426/94 |
| 4,822,981 A | 4/1989 | Chaudoir | 219/214 |
| 4,850,120 A | 7/1989 | Stein | 34/88 |
| 4,990,749 A | 2/1991 | Devine et al. | 219/385 |
| 5,123,178 A | 6/1992 | Stein | 34/88 |
| 5,132,520 A | 7/1992 | Blanton et al. | 219/400 |
| 5,365,039 A | 11/1994 | Chaudoir | 219/401 |
| 5,375,511 A | 12/1994 | Huie et al. | 99/483 |
| D364,530 S | 11/1995 | Robards, Jr. et al. | D7/350 |
| 5,505,009 A | 4/1996 | Stein et al. | 34/543 |
| 5,553,934 A | 9/1996 | Wells et al. | 312/128 |
| 5,639,149 A | 6/1997 | Grassmuck | 312/116 |
| 5,771,789 A | 6/1998 | Davis | 99/483 |
| 5,948,301 A | 9/1999 | Libermann | 219/395 |
| 6,098,529 A | 8/2000 | Brummett et al. | 99/467 |
| 6,111,224 A | 8/2000 | Witt | 219/385 |
| 6,124,572 A | 9/2000 | Spilger et al. | 219/400 |
| 6,127,659 A | 10/2000 | Friedman et al. | 219/398 |
| 6,159,514 A | 12/2000 | Brummett et al. | 426/392 |
| 6,198,076 B1 | 3/2001 | Moen et al. | 219/400 |
| 6,259,065 B1 | 7/2001 | Hohler et al. | 219/400 |
| 6,265,695 B1 | 7/2001 | Liebermann | 219/214 |
| 6,455,816 B1 * | 9/2002 | Reddy et al. | 219/400 |
| 6,595,120 B1 | 7/2003 | Tiemann | 99/426 |
| 2003/0000935 A1 | 1/2003 | Roehr et al. | 219/385 |

* cited by examiner

APPARATUS FOR CONTROLLING THE DRYING OF PREVIOUSLY BAKED GOODS

TECHNICAL FIELD

The present invention is directed to an apparatus for warming and controlling the drying of previously baked dough products to retain their originally baked characteristics over time. In particular, the apparatus controls the moisture in the previously baked goods, such as a filled pastry or other baked dough product, to provide a desired drying profile over an increased period of time in order to maintain its originally baked dual texture.

BACKGROUND OF THE INVENTION

In order for previously baked products to maintain a high quality during display for sale, they have to be handled under precise conditions during their storage. They are usually heated throughout the vast majority of their display period to provide a warmed baked product ready for sale and consumption. This has significant consequences for textural characteristics, including bite and mouthfeel.

Previously baked dough products are displayed for sale in many different ways. Many such products are sold in sealed boxes or bags to retain the moisture content. Such sealed containers, however, result in the equilibration of moisture in the baked products over a period of time. Any moisture gradient that exists after baking is eliminated over time as the moisture migrates from the portion(s) having more moisture to the portions having less. This tends to result in a baked product that is soggy or, at best, uniformly moist and soft, such that it will not have a fresh baked character, i.e., crisp and chewy, after storage for a period of time.

Other previously baked products are sold in a large glass display case that is often open to the air on at least one side. Such displays typically result in significant or even complete loss of moisture from the previously baked product over time, as the moisture evaporates into the air. The products become hard due to the drying out of the moisture. This is particularly true of heated displays, and such heating can occur simply from long-term exposure to incandescent illumination used in many such displays to make the baked products more attractive to the consumer.

Existing devices to simultaneously heat and display baked products using conduction and convection are available for pizzas and operate at temperatures high enough to keep cheese in a soft and at least partially molten form, i.e., from 145° F. to 160° F. Also, many of these conventional heated devices for warming baked products typically dispose these products on a wire rack or a round pizza pan that exactly fits the product. At least some such prior art devices have a thermometer placed near the heat source and use a heat source at the top of the enclosure to directly heat at least the top pizza. Several such devices of this type are sold by Wisco Industries, Inc.

One such device sold by Wisco includes a movable rack inside a housing to display products, and a bi-met thermal switch for temperature control and an operator adjusts the temperature by a dial with no indication of what temperature the warmer needs to be set for any particular products. This device includes a heater with two inlets and one outlet to the transparent display chamber, where the heater uses a cross-flow blower of 110 ft$^3$/min and a 650 W electric heater. The door to the housing is held shut with a magnetic strip that extends along a portion of the housing.

U.S. Pat. No. 5,132,520 discloses an apparatus used to toast bread and buns, which then hot-holds the toasted bread and buns.

U.S. Pat. Nos. 6,098,529 and 6,159,514 disclose a heated merchandiser for displaying prepared donuts using both hot and cold light sources. The reference discloses that some heating occurs to temperatures of 85° F. to 110° F.

In sum, there is no existing apparatus to facilitate the display of a previously baked product that can maintain its fresh baked profile over a period of time to entice the consumer to purchase and consume the product. A higher level of moisture is typically present in the central portion of baked products compared to an outer, drier, crisper portion. This moisture gradient tends to equilibrate over time, providing a product that is soggier than desired as moisture moves outwards into the outer portion of the baked products, particularly after storage in a refrigerator or freezer. Despite the difficulties of retaining the fresh baked profile of previously baked products over time, retailers and their customers desire such products. For added convenience, economic reality, and for culinary delight, it is therefore desirable to have available previously baked products that retain their fresh baked character over time without deterioration of desired organoleptic properties.

Previously baked products or par-baked products that are partly baked are typically frozen or refrigerated. When thawed or cooked in a microwave prior to display, the dough products tend to be soggy and unappetizing since the moisture has no outlet when the product is totally wrapped. Susceptors for use in microwavable products could mitigate this problem, but are typically too time-consuming in the preparation of large quantities of small products that are desired for display in merchandisers. This is because susceptors to help provide crisping require too much time and effort because each susceptor must be placed around each product individually. Thus, there remains a need for equipment to provide such a stable baked product that retains the character of a fresh baked product that does not require the use of susceptors on large numbers of products when they are thawed or warmed in a microwave for display in a merchandiser. The present invention teaches such equipment without the aforementioned disadvantages of existing equipment.

SUMMARY OF THE INVENTION

The invention relates to a merchandiser for displaying and warming previously baked dough products under controlled drying conditions. This merchandiser generally includes an enclosure having one or more wall members that define an interior space, with at least a portion of one of the wall members being transparent, at least one opening for access into the interior space, a removable support member within the enclosure that includes at least one support surface for previously baked dough products and a spacing arrangement configured and adapted to reproducibly position the support member within the interior space of the enclosure member to facilitate substantially uniform airflow around each support surface and throughout the enclosure, and a heating system for providing heated air in the enclosure, wherein the substantially uniform airflow provides controlled drying of the previously baked dough products in the enclosure.

In one embodiment, the enclosure has four wall members arranged in a generally rectangular configuration, the support member includes a frame, and the spacing arrangement is operatively associated with the frame and wall members to provide sufficient spacing between the frame and wall members to facilitate the substantially uniform airflow around the products. In another embodiment, the frame has a generally rectangular configuration with sides that correlate to the wall members, and the spacing arrangement includes spacing members that are present on each side of the frame. In one preferred embodiment, the frame includes a wire rack configured and dimensioned to minimize interruption of airflow within the enclosure, and the spacing members include portions of the wire rack that extend toward the wall members to position the wire rack at a substantially central location in the enclosure so as to provide an air gap on each side of the frame.

In one preferred embodiment, one of the wall members includes a door for closing the opening, and the wire rack and spacing members are configured and dimensioned to allow positioning of the frame in the enclosure in at least a first position where the support surface(s) are angled downward to face the door and a second position where the support surface(s) face away from the door and are angled downward to face an optional second door opposite from the door. In another preferred embodiment, each door is held in a closed position by magnetic force and includes a handle that is sufficiently large to be grasped by an insulating hot pad when the door is to be opened to gain access to the baked products in the enclosure. In yet another preferred embodiment, the magnetic force is provided by a plurality of magnets embedded in about two to four, preferably three, vertically spaced locations in the wall member containing the door and opening. It is preferred that the magnets not be visible outside the merchandiser, and that a portion of the wall member includes a sufficiently opaque material, such as stainless steel, to conceal the magnets.

In one embodiment, the support member includes two or three support surfaces, and the enclosure includes an insulation layer located beneath a bottom wall of the enclosure to inhibit or prevent heat loss from the enclosure. In another embodiment, the merchandiser further includes a mounting structure associated with the support member for mounting and positioning each support surface at a user accessible location. Preferably, each support surface is a portion of a tray that includes a lip extension to inhibit or prevent baked products from sliding off the support surface and is removably mounted upon the support member to facilitate removal for product placement thereon or cleaning thereof. In another embodiment, the enclosure further includes one or more lights to illuminate a portion of the baked products in the enclosure in a manner that does not generate an amount of heat that substantially affects the controlled drying of baked products that are exposed to the light(s).

The heating system typically operates to maintain the interior space of the enclosure at a temperature of about 90° F. to about 180° F. and the baked product retains its organoleptic properties for a period of at least about 4 hours and is located sufficiently remote from the baked products and each support surface, such that direct contact or radiative heating of the products on each support surface by the heating system is at least substantially avoided. In a preferred embodiment, the heating system includes a heat source sufficient to heat the enclosure to provide controlled drying of the baked products therein, an air-moving device sufficient to circulate heat from the heat source through the enclosure, and an optional but preferred reflective member positioned near the air-moving device to inhibit or prevent overheating of the air-moving device from heat generated from the heat source.

In a more preferred embodiment, the enclosure includes a front wall, a pair of side walls, and a rear wall with the front and rear walls being disposed between the side walls, and a housing structure that contains the heating system and that is disposed above each wall of the enclosure, so that the heating system is arranged to direct heated air downwardly into the enclosure and toward at least one wall of the enclosure at an angle of about 10 to 50° with respect to the wall. In another more preferred embodiment, the housing structure includes an outlet configured and positioned to direct heated air into the enclosure, and an inlet to receive air from the enclosure that requires additional heat from the heat source to maintain the controlled drying of the previously baked dough products in the enclosure, wherein the outlet from the heating system corresponds to a portion of the space between a support surface and at least one wall sufficiently to control the substantially uniform airflow and the drying of the products in the enclosure. Preferably, the outlet directs the heated air to enter the enclosure at a distance of about 0.125 to 1 inch from one of the walls to facilitate convective flow of the heated air between the support member and the enclosure walls.

In one embodiment, the merchandiser further includes a temperature control system capable of maintaining the heated air at a temperature constant throughout the enclosure to within about 10° F. above or below a temperature that is selected based on the type of baked products to be placed in the merchandiser. Preferably, the enclosure includes a heat-resistant thermoplastic component. In a preferred embodiment, the temperature is maintained at a constant to within about 5° F. above or below the selected temperature. In another embodiment, the temperature control system includes a proportional controller having a control circuit and sensor signal that regulates electric power based on a signal that is proportional to the differential of sensed temperature and selected temperature, a solid state rectifier operatively associated with the control circuit and sensor signal to provide the selected temperature, and a digital interface so that a user may readily set or change the selected temperature based on the type of baked products that are to be introduced into the merchandiser. In a preferred embodiment, the digital interface of the temperature control system is located outside the enclosure either on or above a wall member adjacent to the at least one opening to facilitate setting of the selected temperature and automatically defaults to the selected temperature setting when turned on after a shut off period. In yet another preferred embodiment, the temperature control system includes at least one pre-programmed setting for a specific type of baked products, a plurality of pre-programmed settings for different types of baked products, or a memory device that automatically stores a manually set temperature and recalls the previously set temperature when the merchandiser is activated, or a combination thereof.

The invention also relates to a merchandiser for displaying and warming previously baked dough products under controlled drying conditions that includes an enclosure having one or more wall members that define an interior space, with at least a portion of one of the wall members being transparent, at least one opening for access into the interior space, at least one support member within the enclosure that includes at least one support surface for previously baked dough products, and a heating system for providing heated air to the enclosure. The heating system includes a heat source, an air-moving device to transfer heated air from the heat source to the enclosure, and at least one reflective device that is positioned near the air-moving device to inhibit or prevent overheating of the air-moving device from heat generated from the heat source.

The invention further relates to methods for displaying and warming previously baked dough products under controlled drying conditions in a merchandiser by providing a temperature-controlled, heated enclosure defined by a plurality of walls, circulating heated air within the enclosure at a rate that avoids overdrying the baked products over a period of at least about 2 hours, and supporting the previously baked dough products on a support member including at least one support surface within the enclosure, wherein the heated air is forced into the enclosure from at least one air inlet through a space provided between the support surface and at least a first wall of the enclosure that is substantially perpendicular to the support surface, so that a substantially uniform heated airflow is provided around at least the support member to control the drying of the previously baked dough products in the enclosure.

In one embodiment, the at least one air inlet is provided adjacent the first wall of the enclosure and directs the flow of air exiting said inlet at a desired angle toward the first wall. It should be understood that the inlet(s) and outlet(s) referred to here are referred to elsewhere in this application as the outlet and inlet, respectively, from the heating system. In another embodiment, at least one air outlet is provided to pull air from another space provided between the support surface and at least a second wall of the enclosure, the second wall being substantially perpendicular to the support surface and opposite to the first wall. In another embodiment, a portion of the air flowing into the space further flows in a direction substantially perpendicular to the first wall and adjacent each support surface.

The invention also relates to methods for displaying and warming previously baked filled dough products under controlled drying conditions by providing previously baked filled dough products that contain a predetermined average moisture level of the filling in an enclosed space upon a support surface such that the support surface contacts at least a portion of the baked products, providing and circulating heated air in the enclosed space to assist in the controlled drying of all the baked products in the enclosure so that those contacted portions of the baked products are shielded from direct contact with the heated air, and controlling temperature in the enclosure uniformly to within about 12° F. of a selected temperature to inhibit moisture loss from each of the baked products to less than about 10 weight percent of the total baked product weight over a period of at least about four hours. Preferably, the moisture loss is less than about 8.5 weight percent of the total baked product weight over about four hours.

In a preferred embodiment, the temperature in the enclosed space is maintained at a selected temperature of between 140° F. to 180° F. and within about 10° F. of the selected temperature. It should be understood that the methods can be accomplished in the merchandiser described herein or in any other suitable apparatus.

BRIEF DESCRIPTION OF THE DRAWINGS

Further features and advantages of the invention can be ascertained from the following detailed description that is provided in connection with the drawing(s) described below.

DETAILED DESCRIPTION OF THE PREFERRED EMBODIMENTS

Figure 1:
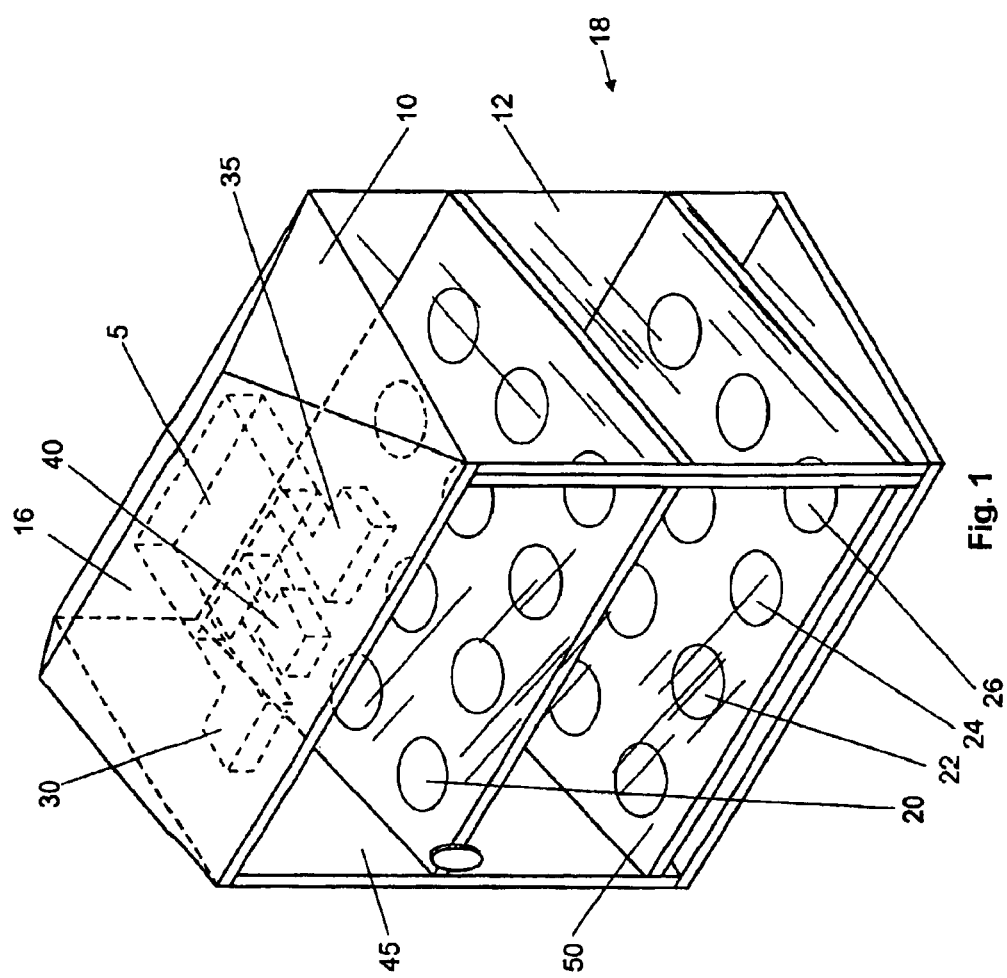
FIG. 1 illustrates a convection-type merchandiser according to the invention.

The present invention relates to a merchandiser for displaying and keeping warm previously baked goods, such as cookies or savory filled pastry dough products, while minimizing or eliminating the sogginess problem that is typically present even after thawing or warming of the products. This merchandiser includes an enclosure having one or more wall members that define an interior space, with at least a portion of one of the wall members being transparent, at least one opening for access into the interior space, a removable frame within the enclosure that includes at least one support surface for supporting one or more previously baked dough products thereon and a spacing arrangement, which optionally but preferably includes a plurality of spacing devices, configured and adapted to position the frame within the interior space and a sufficient distance from each wall member to facilitate substantially uniform airflow around each support surface and throughout the enclosure, and a heating system for providing heated air in the enclosure, wherein the substantially uniform airflow provides controlled drying of the previously baked dough products in the enclosure. The merchandiser can eliminate the sogginess problems of the prior art by providing more rapid crisping, or drying, of an outer portion of baked products through controlled drying.

Any suitable pastry dough product can be warmed in the apparatus of the invention while the drying thereof is controlled, but in one preferred embodiment the pastry dough products include a dough portion, a filling portion, and optionally a topping. Preferably, the dough portion at least substantially surrounds, or entirely surrounds, the filling portion. The dough product will typically have a filling for each piece, the filling being different from the basic dough, i.e., being made from a different material or having a different viscosity. Any suitable filling can be included, e.g., the filling can be either a solid, creamy, or a liquid filling, or even pasty in viscosity. The filling can be a sugar-based confection, such as caramel, chocolate, or a liquid filling. The filling can also be a solid filling, such as chocolate, a flavored dough, or another aromatized dough. Other suitable fillings include fruit jams, sugars, puddings, ice cream, soft candy formulations, chewing gum, marshmallow, and the like. For non-sweet doughs, the filling may include cheese, sauces, spices including savory spices, fruits, vegetables, and the like. The filling can also or alternatively include one or more of a vegetable, cheese, sauce, spice, meat, chicken, fish, or the like, such as in the popular Hot Pockets®. The filled pastry product can include sandwich components wrapped in dough. Filled dough products preferably contain about 10 to 60 weight percent water content, and in one embodiment contain about 40 to 55 weight percent water content. Typically, more of the moisture is present in the filling than the dough portion, preferably at least about 55 percent, and more preferably at least about 60 percent of the water is present in the filling with the remainder in the dough portion. Meat is particularly preferred in one embodiment, and other compatible fillings such as cheese can also be included. These types of fillings could also be used as a topping over the bakery dough product, such as cheese and/or tomato on bruschetta or focaccia bread, although care is preferably taken so that toppings do not contact the support or other interior surfaces in the enclosure, which can cause unsightly charring or a burned flavor or sensation in the baked dough product. Any of these fillings can be used in combination for a suitable filling, e.g., caramel and chocolate, or sauce and chocolate, and one or more sweet and non-sweet fillings can even be used separately or in combination with each other.

The present invention advantageously provides a device for displaying and warming previously baked dough products, such as filled pastry products, cookies, brownies, muffins, and the like, under controlled drying conditions. Preferably, the device is used to display and warm baked sweet dough products or savory dough products. Savory dough products typically require heating to at least 140° F. to ensure sanitary conditions, while sweet dough products can be warmed to lower temperatures of about 90° F. to 140° F. or to temperatures of greater than 140° F. to about 180° F. The invention permits and facilitates food service sales, which are baked products prepared at a centralized food preparation center, if desired, and distributed later to the retailers that intend to display and sell the product according to the invention. The pre-baked products are typically frozen or refrigerated immediately or soon after baking, then transported as needed to various retail or wholesale sales locations where they are thawed and/or heated and then displayed in a merchandiser according to the invention.

The device includes an enclosure to display the baked products while they are maintained in a substantially fresh-baked state, i.e., by controlling the drying of the products. When placed in the enclosure of the present merchandisers, the baked products are preferably at least partly unwrapped for at least one of the following reasons: to facilitate viewing by interested consumers; to avoid high local humidity and consequent sogginess; and to facilitate transfer of moisture between the baked products and the warmed air in the merchandiser of the invention. Preferably, the baked products are predominantly unwrapped or entirely uncovered, although a support surface is disposed under at least a portion of the baked products to provide support thereto. In particular, this controlled drying is achieved by creating a moisture gradient in the baked product. For cookies, controlled drying limits or avoids moisture equilibration in the baked product and allows the cookie to retain a crisper, drier, outer zone and a chewier, moister central zone, i.e., a dual texture, over time. This is also true for other filled pastry dough products, e.g., filled sandwich pastries, where the filling typically contains a higher moisture level than the surrounding pastry dough. The merchandiser of the invention can advantageously reconstitute these fresh-baked characteristics in a pastry product, whether filled or not, and help maintain them, even in filled pastry products where the moisture between filling and surrounding dough has equilibrated. This ability of the present invention can be used to minimize or avoid the need to use two or more dough formulations to achieve texture variation in the baked products. The device typically includes a heating system to heat the baked products to provide the controlled drying thereof. In one embodiment, the invention warms and displays the previously baked dough products without the need for an oven.

Varying types of previously baked products can be selected for warming, and each type will have a desired warming temperature and typical range of time that the apparatus of the invention can recreate and maintain the desired fresh-baked organoleptic characteristics so desired, e.g., in food service applications. Previously baked products may be kept in the enclosure for at least about 0.25 to 8 hours. Preferably, the products are kept in the enclosure for at least about 4 to 6 hours, more preferably for about 0.5 to 4 hours, although specific times may vary depending on various factors including the type of previously baked product, the warming temperature (as dictated by choice or by law), and the like. For example, for filled pastry products, especially those containing more readily spoilable components or those requiring higher temperatures to achieve antiseptic conditions, such as meats, chicken, fish, and certain cheeses, the maximum suitable warming time tends to be less than for other baked products such as cookies or brownies, which can be warmed at lower temperatures. Thus, for filled pastry products, a preferred warming time range is from about 0.25 to 4 hours at temperatures of above 140° F. to 180° F. For cookies, brownies, and certain other non-filled baked products where a lower temperature is desired, the apparatus can be pre-set to reach a temperature of about 120° F, although various other temperatures can be programmed at the factory or by the operator if desired. In conventional warmers that fail to control drying, particularly at higher temperatures required for filled pastry products, although the dough portion of the baked product becomes crisp after heating and warming, the fillings frequently become overheated and consequently dried out and chewy. Without being bound by theory, the present invention can operate to control the drying rate of the baked products such that the dough portion becomes crisp first and act as a shell to seal moisture in the filling and inhibit or prevent excessive moisture migration out of the filling by slowing or halting the rate of moisture loss. Also, the controlled drying of the present invention can maintain some level moisture in the enclosure, e.g., moisture that migrates into the air from overly moist dough or pastry rather than added moisture from external sources. This helps control the drying to inhibit or prevent the filling and/or topping from becoming overly cooked and dried.

The enclosure typically has one or more wall members that define an interior space, with at least a portion of one of the wall members being transparent, at least one opening for access into the interior space, at least one support member having support surface(s) for supporting one or more previously baked dough products, optionally at least one mounting structure associated with the enclosure for mounting and positioning each support member or support surface at a user accessible location in the interior space of the enclosure, a heating system for providing heated air in the enclosure, and a temperature control system that may be set by the user. The enclosure and portions thereof, such as its wall members, may be formed of any suitable material, but are preferably formed from a clear, high-temperature heat resistant thermoplastic, such as an acrylic, PLEXIGLASS, or a polymer containing polyamide units, or any combination thereof. The improved temperature control system also allows a significant versatility in materials in that higher temperatures can be used in the enclosure knowing that peak temperatures can be kept within a certain temperature range that will not melt the wall materials. At least one wall is preferably transparent to lure the customer to view the delicious baked treats therein without having to open the enclosure, which minimizes the amount of times the enclosure is accessed. Opening the chamber too often can permit moisture to escape the chamber and accelerate drying. One or more small air gaps, however, can be included in the enclosure, such as to permit a small portion of the aroma-laden air in the enclosure to escape and entice consumers to consider the baked products within.

In a preferred embodiment, at least three or four wall members are transparent or are at least sufficiently transparent to permit a viewer to see the baked products therein. In another preferred embodiment, a small air gap can be present in between at least one of the apertures and a wall member to permit aroma from the warmed, baked products to escape into the surrounding atmosphere. The air gap can also be, for example, one or more holes in one or more wall members. This air gap advantageously permits consumers to smell the baked products without having to open the aperture, although additional aroma does escape the enclosure each time the aperture is opened. The optional air gap is preferably sized sufficiently to permit a small amount of aroma and moisture to escape but small enough to retain a predominant and preferably a substantial amount of the moisture therein.

The opening to access the baked products is typically a door, either hinged or sliding, to permit rapid and easy access to the products when a purchase is desired and/or when a merchant desires to load previously baked products into the merchandiser. Other types of suitable opening will be readily apparent to those of ordinary skill in the art. One preferred aperture is to have a door on the same side of the enclosure as a transparent wall member so that a consumer can see the baked product and open the aperture to grab the desired baked product, preferably where both the wall member and the door are sufficiently transparent to view the products inside the enclosure. Another preferred embodiment is to have a second aperture on the opposite wall member or an adjacent wall member for the retailer to add additional baked products. This is particularly useful when the counter space is small and the apparatus must be placed against a wall or in a corner. As the merchandiser is emptied of baked products by consumers, product replacement can be made a few at a time, or an entire tray can be removed and a fresh tray of baked products loaded therein. In one embodiment, the entire support member is removable and reproducibly positionable inside the enclosure so that previously baked products can be loaded on a removed or a spare support member, which can then be replaced into the enclosure or exchanged with a support member. This minimizes the time in which the merchandiser is out of use, which can maximize potential sales. The opposite wall member is a preferred location for the second door, although placement of the merchandiser in a corner location of a room would require placement of the second aperture on an adjacent wall member for simplicity of access. Optionally, the door may be held in place by one or more magnets that can be embedded within a wall or other portion of the enclosure. The magnets are preferably hidden from view to impart a more pleasing appearance to the merchandiser. Additionally, when the merchandiser contains one to three button-sized magnets this can facilitate operation of the aperture by an operator wearing an oven mitt, particularly when used with a mitt-receiving door handle, the aperture becomes easier to open than compared to certain other types of closure mechanisms that are traditionally used in such merchandisers.

In one preferred embodiment, the enclosure includes two or three support surfaces on which to display a variety of baked goods. For example, cookies can be disposed on one surface and brownies or filled pastry products on the other. In a preferred embodiment, the surfaces are disposed in a vertically stacked fashion with sufficient spacing therebetween to permit the consumer to both view and access the baked products disposed thereon. The support surface can be a tray used to bake the product in another apparatus, which tray can then be moved into the merchandiser of the present invention without having to individually place the baked products into the merchandiser. Again, it is possible for the entire support member to be replaced or exchanged after heated previously baked products are disposed thereon. Since the support surface, or support member as a whole, is often moved after being in an oven to warm the baked products thereon, it can be seen that a operator of the merchandiser is typically an oven mitt wearing operator. Alternatively, the support surface can be a sheet or wire rack upon which the previously baked products can be individually disposed before the sheet or rack is placed in the enclosure. These embodiments can help avoid the need to keep the enclosure open to the ambient atmosphere for a long time, which affects the controlled drying of products remaining in the enclosure such as on a second support surface therein. It is also desired that the support surfaces, or trays, be sloped at an angle to make more of the baked products more clearly visible to the consumer, which sloping also improves the convective heat transfer and facilitates control of the drying of the baked products thereon.

The enclosure preferably further includes electrical illumination which generates light to illuminate the baked products in the enclosure. The electrical illumination may be light bulbs that are arranged in any fashion, such as symmetrically, within the enclosure to direct light uniformly toward the tray and the baked products thereon. These light bulbs generally have a total wattage of about 15 W to 40 W and are placed at a distance from the tray that is sufficient to provide light but insufficient to significantly affect the controlled drying of the merchandiser of the invention. An exemplary distance of one or more illuminating lights is a total of 40 W of light placed about 10 cm to 18 cm, preferably about 14 cm from the tray. The bulb may be incandescent or fluorescent, but is preferably incandescent.

The enclosure contains a support member that supports at least one support surface to hold a plurality of previously baked products. The support member can be any suitable food-grade material that resists temperature of at least 185° F., but it is typically a metal, such as aluminum, a stainless steel, or an alloy thereof. The support member is typically arranged to position the support surfaces vertically apart from each other while presenting a small profile to minimize or prevent disruption of convective air flow through the enclosure and preferably between and around the support surfaces of the support member. A preferred form for the support member is a wire rack or frame, such as using rounded or elongated wire cross-sections to reduce drag. The at least one support surface typically includes a surface that is at least substantially planar. The surface(s) can be, for example, a tray or sheet on which to display the baked products in the enclosure. The surface(s) is shaped and dimensioned to fit in the enclosure, which will for instance have a generally square or rectangular shape. The surface(s) each have at least one edge that can also optionally be turned upward or downward to form a lip or notch. An upward lip can be included to inhibit or prevent the baked goods from sliding or falling off the surface. A downward lip or protrusion, or upward notch, can be included on the surface to help position any removable support surfaces properly on the support member, such as by operatively associating the properly positioned surface against a lip or wire mounting assembly of the support member within the enclosure. Multiple lips or notches in either or both directions can also be used to similar effect. In a preferred embodiment, the support surface is mirrored and contains both an upward lip to inhibit or prevent baked products from sliding off the support surface as well as an upward notch that receives a portion of the frame and inhibits relative movement between the support surface and support member to The support surface can also have notched corners where no lip exists. This embodiment avoids any point where more than two edges join, which facilitates cleaning the support surface between uses in the merchandiser.

The support member of the present invention is preferably a rack, or frame, with a spacing arrangement to facilitate positioning of the support member in the enclosure. In particular, the spacing arrangement can include any suitable device(s) to help ensure that the support member is reproducibly positionable within the enclosure, preferably a sufficient distance from the walls of the enclosure on at least one side, and preferably on all four sides of the frame. Any suitable spacing arrangement may be readily employed by those of ordinary skill in the art, including spacing notches, bends, bumps or protrusions, extenders, members, or other suitable devices added separately to the support member such as by welding, glue, snap-fitting, or the like. An exemplary spacing arrangement can include U- or V-shaped protrusions or posts extending away from the support member. The spacing arrangement preferably includes integrally-formed bumpers that are part of the support member. For example, a bend or protrusion in part of the support member can provide the spacing arrangement, particularly when the support member includes wires or tubes to provide part of its structure. The spacing arrangement can be formed at any height on the support member, although pairs of suitable spacing devices on a given side are preferably at approximately the same height. Preferably, a number of spacing devices extend horizontally from the support member to position it a sufficient distance from each wall of the enclosure. More preferably, the support member includes portions of wires or tubes, or both, that extend horizontally to form the spacing arrangement.

It is also preferred for the spacing arrangement to include at least first and second spacing devices on each side of the support member where a first spacing device is spaced sufficiently apart from the second spacing device on each side of the support member to facilitate positioning thereof within the enclosure. The spacing arrangement preferably includes portions that are present in pairs on each of the four sides of the support member. The wires, tubes, or other supportive portion of the support member are typically arranged to minimize interruption of airflow within the enclosure.

Preferably, the spacing arrangement situates the support member at a suitable distance from each side of the enclosure to facilitate the movement of heated air around the interior space of the enclosure to facilitate at least substantially uniform, or uniform, drying of the baked products therein. The removal and replacement of the support member in a reproducible fashion advantageously minimizes or eliminates operator error in positioning the support member when the support member is provided into the enclosure, e.g., after a cleaning or after loading up the support member with two or three support surfaces, e.g., trays, of freshly baked products thawed and/or heated in an oven or microwave. Another type of suitable spacing arrangement includes grooves or slots, or projections, from the bottom of the enclosure that facilitates positioning of the support member therein. For example, a square or rectangular groove that matches the size and shape of the support member can be formed in the base of the enclosure, and the groove can be arranged so that the support member tends to position itself by falling into this groove as an operator places it into the merchandiser enclosure. Improper spacing can lead to uneven drying and warming, and ultimately an unsavory product, which the present invention advantageously can avoid.

In a preferred embodiment, the spacing arrangement positions the support member about 0.125 inches to about 2 inches from one or more sides of the enclosure, and preferably from each side of the enclosure. Preferably, the spacing arrangement positions the support member about 0.25 inches to about 1 inches, more preferably from 0.3 inches to 0.8 inches, from one or more sides of the enclosure, and more preferably from each side of the enclosure. The spacing arrangement can provide for different spacings on opposite sides of the support member, although preferably the support member is substantially centered in the enclosure. The typically two or three support surfaces, e.g., a tray or sheet, of the support member, e.g., a frame or rack, may alternatively be fixed or removably mounted upon the support member or on a separate mounting structure within the enclosure to facilitate product placement thereon and cleaning thereof. It is preferred that the support member is entirely removable. It is also preferred that the support member is reversible, such that it can be disposed in the enclosure interior in at least two separate directions, typically opposing directions, so that tilted support surfaces thereof can be better displayed toward an opening in the enclosure where baked products can be placed in or removed from the enclosure, or both. This is useful where the enclosure has two openings so the operator can place the support member into the enclosure from one opening and a consumer can remove baked products from an opening on the opposite wall.

In one embodiment where the support member is fixed, and forms or is associated with a mounting structure, the at least one support surface in the enclosure is operatively associated with at least one mounting structure, which is itself associated with the enclosure. The mounting structure(s) are disposed for mounting and positioning each support surface at a user accessible location in the interior space of the enclosure. For example, the mounting structure itself can be a wire rack, optionally fixed to the walls of the enclosure, for receiving and supporting a support surface and the baked products typically disposed thereon. In a preferred embodiment, the mounting structure includes at least a lip, posts, extended post, or edge fixed to at least two opposing walls of the enclosure to guide and receive a support surface so that no wire rack is needed in the central portion of the merchandiser. The use of a mere lip without a wire rack is desired because an inattentive store clerk might be likely to ignore the support surface and dispose the baked products on the open wire rack, which would too rapidly dry out the baked products. The use of a lip as the mounting structure forces the operator to dispose the cookies on the support surface and install the surface in the enclosure. The embodiment where the support member is a separate free-standing, preferably removable, structure is even more desired since it avoids many of these potential problems. The mounting structure for removable support surfaces can then be disposed adjacent, or integrally formed with, the support member. Particularly preferred mounting structures include posts, extended posts or bars across the support member, or even notches or grooves into which a support surface can be slid.

One of the support surfaces contacts at least a portion of each previously baked product to shield those portions from direct contact with the heated air, such that the drying of moisture in the baked products is controlled to maintain the organoleptic properties of the products at essentially the same level as those of freshly baked products for a period of at least about 2 hours. In one preferred embodiment, the properties are maintained for at least about 6 hours, and in another, the properties are at least substantially maintained for at least about 4 hours. The support surface preferably covers at least about 34 percent, preferably at least about 50 percent, and more preferably at least about 75 percent or at least about 95 percent, of the underside of each baked product. Most preferably, the entire bottom surface of each baked product can be contacted by a support surface to minimize moisture migration from the central zone of the baked product to be warmed. For example, it has been found that holes or gaps of less than about 3 mm in diameter (less than about 7 mm$^2$) in the support surface are sufficiently small to avoid significantly contributing to the overdrying of cookies that have a diameter of 10 cm. Various other support surfaces can be envisioned using different geometric patterns. It is also feasible to use wire racks and dispose coverings that block contact with the warmed air over a sufficient portion of the top of each baked product to control drying. This is less preferred than having bottom shielding as noted above, because coverings on the top tend to at least partially obscure the baked product.

In this invention, certain of the baked products to be warmed have a central portion and an outer portion arranged about the central portion so as to retain a moisture gradient that includes at least about 8 percent water content in the central portion of the baked product and below about 7 percent water content in the outer portion of the baked product for several hours during warming. The central portion typically represents the innermost 33 to 66 percent of the area or volume of the product while the outer portion represents the outermost 17 to 33 percent of the area or volume of the product. Preferably, the moisture gradient of certain baked products, such as cookies, includes at least about 7.5 percent water content in the central portion and below about 4 percent water content in the outer portion after about 6 hours in the enclosure. These numbers may vary for baked products having a height greater than about ¼ inch. When the baked product is a substantially round cookie of about 2 to 5 inches in diameter, the central portion is a width of about ¾ inch to 1¼ inch and the outer portion is a band having a diameter of about ¼ to ¾ inch as measured from the periphery of the cookie.

The previously baked dough products preferably have a predetermined average moisture level therein. The initial moisture content can be adjusted to take into account the subsequent loss of moisture that necessarily occurs depending on the residence time in the merchandiser while the warmed product still exhibits the desired organoleptic and/or texture properties. In one embodiment where the product is a cookie, the cookie contains an average of about 6 to 10 weight percent moisture, preferably 5 to 8 weight percent moisture, after the initial baking and during storage thereof. The initial moisture level can be controlled by the water in the recipe and during the baking of the product. These initial moisture levels are preferably accomplished by freezing or refrigerating the baked product as noted herein. Refrigeration or freezing does not typically significantly alter the initial moisture content if the baked products are properly packaged. Preferably, the edge of the previously baked cookie has a moisture content of about 5 to 6.5 weight percent after a one-hour residence time in the merchandiser. The center zone of the previously baked cookie has an initial moisture content of about 7 to 10 weight percent before warming, while in one preferred embodiment the center zone has about 8 to 9 weight percent moisture before warming. The initial moisture content represents the level of moisture present in the products immediately after baking, and the invention preferably uses baked products that are packaged within about 1 hour of being baked, preferably within about ½ hour, to help inhibit moisture loss in the product prior to packaging and subsequent warming for display and sale.

The previously baked products are also preferably chilled promptly after packaging, and preferably are frozen until ready for use. The freezing or refrigerating of previously baked products also facilitates retaining moisture and a moisture profile within the products. Thus, the products in which dual texture is desired are typically frozen in less than about 4 days, preferably less than about 1 day, and more preferably less than about 6–8 hours, after baking. Such rapid freezing inhibits moisture equilibration, which reduces crispness of the edges of the baked products. The freezing should also occur over a sufficient time to permit a reduction in condensation and inhibit or avoid possible frost formation inside the package of previously baked products. Thus, the cooling and freezing should take at least about 30 minutes. The specific recipe of the baked product is not critical, however, using certain types of fats and humectant sugars, as well as varying the size and shape of the baked products, can modify the desired moisture profile in the baked product when warmed for display and sale as is understood by those of ordinary skill in the art, particularly with reference to this description. For example, sugars that bind the moisture and inhibit migration are desired to facilitate the dual texture products, although the recipe is less important for baked products that are frozen soon after baking as noted above. One particularly suitable baked product formulation is the cookie recipe available on the commercially available Tollhouse® chocolate chip morsel packaging, as well as reasonable variations thereof. Another includes the commercially available Hot Pockets® filled pastry products. An exemplary filled pastry product size is about 2 to 12 ounces, preferably 2 to 7 ounces. Any baked product sized to fit in the merchandiser will be suitable, although products sized about 2 to 10 inches in length and about 3 to 5 inches in width permit sufficient numbers of products to be placed in the enclosure. A typical filled dough product of 6 ounces typically loses about 6 to 20 grams of water, preferably about 8 to 15 grams of water, after about four hours in an operating merchandiser of the invention.

For better heat control in the enclosure, the merchandiser further includes a temperature control system that may be set by the operator, pre-set, or either automatically defaulted, or be manually directed to return, to its previous setting when shut off and turned on again. The temperature control system preferably has a digital user interface. The user interface can be any suitable system with a display and control mechanism, such as having pre-set temperature increments that can be obtained using rocker switches to facilitate use by an oven mitt-wearing operator. If desired, the temperature can be set to a particular number, e.g., 170° F., and the temperature control system can be designed to reach a temperature slightly higher, e.g., 175° F. or 180° F., to facilitate early crisping and to drive off moisture in the outer portion of the baked products, and then automatically return to the set temperature after a brief period of time, e.g., about 2 to 20 minutes, after the enclosure is activated.

Preferably, the temperature is maintained at a constant to within about 5° F. of the desired temperature at a given point over time. For example, a temperature setting of 170° F. would typically have a temperature variation of about 12° F., preferably 6° F., above or below the set temperature. This can be achieved by use of a proportional controller that provides an error signal that is proportional to the differential of actual temperature from the set point. Generally, the proportional temperature control system includes a solid-state rectifier controlled by a proportional circuit and a thermistor sensor to provide the exact amount of electric power needed to maintain a constant temperature. Also, at least one thermometer can be placed sufficiently far from each aperture of the enclosure and each heat source to more accurately monitor the temperature in the enclosure to reduce or avoid erroneous readings that can lead to over- or under-heating. Advantageously, the temperature control system can automatically default to its previous setting after being shut off, then turned on again. The temperature control system may preferably have programmed settings for certain baked products, such as cookies or Hot Pockets®. The temperature control system is ordinarily located on a side of an exterior wall member of the enclosure, or on the housing above such side wall member, to facilitate access from either the front or back thereof. This is particularly useful when the apparatus is placed against a wall, so that an opening and the temperature control system can both easily be accessed without moving the merchandiser.

The enclosure typically includes a housing structure for receiving and concealing the heating system and the vertical walls include a front wall, pair of side walls, and a rear wall disposed between the front and side walls, wherein more than one wall is made at least partially transparent to facilitate viewing of the baked products therein from different angles. Also, the housing may be adapted on at least one outer surface to receive advertising concerning the baked products, such as cookies or filled pastry products, therein, which advertising is visible to the user, e.g., a consumer.

The housing structure is preferably on top of the enclosure and is formed from stainless steel, aluminum, or a heat-resistant plastic, such as a polymer containing polyamide units, or any combination thereof. The housing encloses the heating system of the merchandiser. The exterior of the housing is preferably placed at an angle of about 40° to 80° preferably from about 55° to 70°, from each wall member of the enclosure. The interior air-handling portion of the housing that contains one or more air-moving device(s), heat source(s), and optionally reflective device(s), has at least one inlet for cooler air intake and one outlet for heated air output to the enclosure. The outlet(s) are preferably disposed at an angle of about 10° to 50°, preferably about 20° to 40° from an adjacent vertical wall member. This angling minimizes or avoids direct blowing of the heated air on the products and rapid drying out of the products, and advantageously facilitates convective currents in the enclosure so the air flows smoothly, preferably in substantially laminar fashion, around the support member and preferably between and around the support surfaces thereof. The entire interior of the merchandiser is preferably also arranged to facilitate an orderly flow pattern of heated air throughout the enclosure. As a result, the warming and drying of the baked products in the enclosure is controlled, preferably by minimizing or avoiding blowing of heated air directly onto products, which tends to undesirably accelerate drying of the products over time. The heating system can heat the enclosure to temperatures from about 90° F. to about 180° F., preferably from about 155° F. to 180° F. for filled pastry products. Temperatures as high as 180° F. are often necessary for holding such savory products, particularly when they are filled. In one embodiment, an enhanced insulation layer located on the bottom wall member of the enclosure inhibits or avoids loss of heat from air circulating adjacent the bottom of the enclosure.

The heating system includes a heat source, an air-moving device, a reflective device positioned near the air-moving device to inhibit or prevent overheating of the air-moving device from heat generated from the heat source, and a plurality of inlets and outlets. The heating system is generally operatively associated with the temperature control system disposed to be accessed outside the merchandiser. The air-moving device can be any device suitable for forcibly moving a sufficient amount of air adjacent a heat source and back into the enclosure to control the drying of the baked products therein. Particularly suitable air-moving devices include fans, pumps, and the like, or any combination thereof. A tube axial fan is a particularly preferred type of fan. Although any suitably powered fan may be used to facilitate convection of heated air into the enclosure, preferably the fan has a power output of about 5 W to 25 W, more preferably from about 10 W to 20 W. The fan can circulate air at any suitable speed to conduct the controlled drying, although preferably it operates at a speed of about 25 to 55 ft$^3$/min, more preferably at about 35 to 45 ft$^3$/min. A suitable commercially available fan is an EBM fan available from EBM Industries, Inc. in Farmington, Conn. Although faster fans can be used, care must be taken to minimize overdrying of baked products, particularly on the topmost support surface nearest the outlet from the heating system.

The heat source can be any suitable heat source available to those of ordinary skill in the art, such as incandescent lamps, conventional heat lamps, heating coils, and the like, as well as combinations thereof. Heating coils are preferred since they can be better adjusted to avoid heating the baked products too much or too fast. It is also preferred that the heat source(s) be positioned to minimize or avoid direct radiant heating, conductive heating, or more preferably both, of the baked products. Preferably, the heat source(s) is disposed in the housing and only convection is used to substantially heat the air and provide the controlled drying in the enclosure. Heating coil(s) in a preferred embodiment of the invention should typically provide a total of about 100 W to 800 W, preferably about 250 W to 650 W. For an enclosure that is about 14 inches square with three support surfaces therein, a heating coil of 450 W, 500 W, or 550 W, is exemplary.

Although less preferred, it is also possible to place the heating system in a cage at the top of the enclosure, where the cage can help prevent injury to a consumer if the heat source fails catastrophically. In one embodiment, an incandescent-type heat source at the top of the enclosure includes PTFE-coated bulbs (TEFLON®) to inhibit such catastrophic failures, directional lamp bulbs to direct heat into a preferably more symmetrical heating pattern, or a combination thereof. The position, number, and wattage of the bulbs needs to be designed according to the size of the enclosure, as can be readily determined by those of ordinary skill in the art based on the description herein. Preferably, in this embodiment at least two incandescent bulbs are included in the heat source. In one preferred embodiment, each bulb is about 75 W to 140 W, preferably about 100 W to 130 W.

In one embodiment, the reflective device is placed between the air-moving device and the heat source. It should be understood that a single reflective member or multiple reflective members may be used in forming the reflective device in the present invention. The reflective device is preferably reflective at least on a side facing the heat source to inhibit or prevent overheating of the air-moving device. The reflective device functions to help cool the air-moving device and to inhibit or avoid direct radiant heating from the heat source, which prolongs the life of the air-moving device to advantageously extend its operational life and helps direct heat downstream to further warm the air flowing back into the enclosure. Typically, the air-moving device is upstream from the heat source and directs cooler air adjacent, i.e., around or through, or both, the heat source and then through the outlet and into the enclosure. In a preferred embodiment, the air-moving device is upstream from the reflective device to further minimize overheating of the air-moving device. The reflective devices can take any suitable shape, although preferably each reflective device is shaped to substantially correspond to the internal shape of the heating system so as to facilitate laminar air flow from the air-moving device and around each reflective device to the heat source. Preferred reflective device shapes include circular, oval, or elongated, as the heat system is preferably disposed in a pipe or tube and since shapes without multiple sharp corners tend to permit increased air flow thereabout.

In one embodiment, the support member only optionally includes a spacing arrangement. In this embodiment, the support member within the enclosure that includes at least one support surface for supporting one or more previously baked dough products thereon is positioned a sufficient distance from each wall member to form a space that facilitates substantially uniform airflow around each support surface and throughout the enclosure, and the heating system for providing heated air in the enclosure is disposed in a second enclosure operatively associated therewith. The heating system preferably includes a heat source, an air-moving device to facilitate air flow to convectively heat the baked products in the enclosure so as to control the drying thereof, an inlet configured and positioned to direct heated air into the enclosure to provide substantially uniform airflow therein, and an outlet to receive air from the enclosure that requires additional heat from the heat source to maintain the controlled drying of the previously baked dough products in the enclosure, wherein the inlet sufficiently corresponds to a portion of the space between a support surface and at least one wall member to control the substantially uniform airflow and the drying of the products in the enclosure.

Although direct conduction heating of the products can be at least in part accomplished by disposing a heat source in one or more support surfaces, it is preferred that the heat source be located sufficiently away from the baked products and tray such that direct heating, e.g., conduction heating, of the products on the support surface by the heating element therein is substantially or entirely avoided. Such direct heating can overcook and dry out the baked products. Also, for filled pastry products, particularly those including meat or cheese, or both, the heating system should operate to maintain the interior space of the enclosure at a set temperature of about 155° F. to about 180° F. so that the baked product retains its organoleptic and/or texture properties for a period of at least about 6 hours. In preferred embodiments, the temperature is within about 12° F., or preferably within about 10° F. or within about 6° F., more preferably within about 5° F. above or below the desired set temperature throughout the entire enclosure.

The inlets and outlets are preferably oval or circular in shape. They typically do not have the same size or the same cross-sectional area to permit air through, although they can be the same. The inlets and outlets pull and blow air respectively from the sides of the support surfaces, which again minimizes or avoids direct blowing of air on the products and the resultant overdrying that would occur. Optionally, the heating system may include baffles to help direct air into the enclosure. These baffles can either be inside or before the outlet, or in the enclosure adjacent the outlet, but they are preferably adjacent to the heating coil inside the conduit that contains the heating system to facilitate at least substantially uniform airflow to the various apertures of the outlet. It should be understood that the inlet and outlet can be a unitary aperture or, preferably, a plurality of smaller apertures of the same or different sizes. It is preferred that the apertures are the same size, and the total area of apertures is preferred to be sufficiently large that the proper convective air flow can be arranged so that the products receive only controlled drying rather than overdrying.

Using an exemplary size enclosure of about 14 inches square, inlet and outlet spacing can be provided in more detailed fashion. The inlet(s) and outlet(s) are preferably independently spaced and sized. It should be understood that any suitable size, cross-section, location, or number of inlet(s) and or outlet(s) may be suitably used if they facilitate controlled drying of the baked products. In an exemplary embodiment, the outlet(s) are preferably located about 0.125 inches to about 2 inches from the sides of the housing. Preferably, the outlet is independently spaced from about 0.25 inches to about 1 inch from the adjacent side wall where the enclosure is adjacent to the housing, more preferably from about 0.3 inches to 0.8 inches. Additionally, the outlet is typically spaced about 50 to 98 percent across the width of the housing (adjacent to a wall), about 3 to 30 percent of the length, i.e., the distance from one wall away therefrom, such as from a wall towards an adjacent support member, or both. Preferably, the outlet is spaced about 60 to 90 percent across the housing width, from about 5 to 20 percent across the length, or both.

The inlet to the heating system from the enclosure is typically spaced about 10 to 50 percent across the width of the housing, about 0.5 to 50 percent across the length, or both. Preferably, the inlets are spaced about 15 to 35 percent across the width of the housing, from about 1 to 35 percent across the length, or both. The inlet is typically about 2 to 6 inches across, preferably 3 to 4.5 inches across the width of the housing, and has a size of about 1 to 5 inches, preferably about 1 to 3.5 inches in length across the housing. The inlet is generally located in the zone from about 0.1 to 5 inches, preferably 0.2 to 3 inches away from the adjacent wall and across the length of the enclosure. In one preferred embodiment, the inlet is centered along the width of the housing.

The outlet generally has an oval or elongated shape having a minor axis or width that is preferably no greater than that of the distance between the support member and the wall member adjacent the outlet. The inlet that returns cooler air to the heating system can more readily extend over the support member, but the preferred outlet shape facilitates smooth airflow throughout the enclosure and controlled drying of the baked products therein. In a preferred embodiment, the inlet and outlet independently can be designed to include a plurality of smaller apertures through which the heated air transfers to and from the heating system from the enclosure.

FIG. 1 shows a merchandiser according to the invention using convection-type heating. In FIG. 1, the heating system 5 is preferably disposed in a housing 10 above the walls 12, 14, 16 of the enclosure 18. The housing 10 is preferably at least substantially sealed to the walls 12, 14, 16 to inhibit moisture migration between the enclosure 18 and the ambient atmosphere. The housing 10 is preferably opaque so that the consumer can see the baked products 20, 22, 24, 26, etc., rather than the workings of the merchandiser. Another benefit of having a housing 10 disposed over the enclosure 18 is that the housing 10 can be designed to receive advertising (not shown) regarding the baked products 20, 22, 24, 26 in the associated enclosure 18. One or more fans, pumps, or other methods of moving air within the enclosure is optionally, but preferably, used to help control drying and to facilitate a substantially uniform temperature within the enclosure. In one embodiment, the fan operates at 12 W of power or air circulation capacity of about 36 to 44 cubic feet per minute. Such air-moving device(s) (not shown) are preferably disposed in the housing 10. A temperature control system (not shown) can be disposed on the side of the merchandiser.

A spacing arrangement (not shown) can be provided on or in connection with the support member having support surfaces 45, 50 to reproducibly arrange the position of the support member in the enclosure. In a preferred embodiment, spacing devices (not shown) are present on each edge of the support member having support surfaces 45, 50. The heating system 5 includes heat-producing lamps to heat the baked products 20, 22, 24, 26. In this embodiment, the air-moving device(s) is (are) required to ensure convective heating of the baked products, which will facilitate substantially even heating thereof. It should be understood that convection heating for at least substantially all, or all, of the heating is desired to avoid overdrying the baked products in the apparatus. Without being bound by theory, it is believed that convection forms a thin hardened moisture barrier on the skin of the baked product to a greater extent than other forms of warming. This skin is believed to inhibit moisture migration from the central zone of the baked product.

Figure 2:
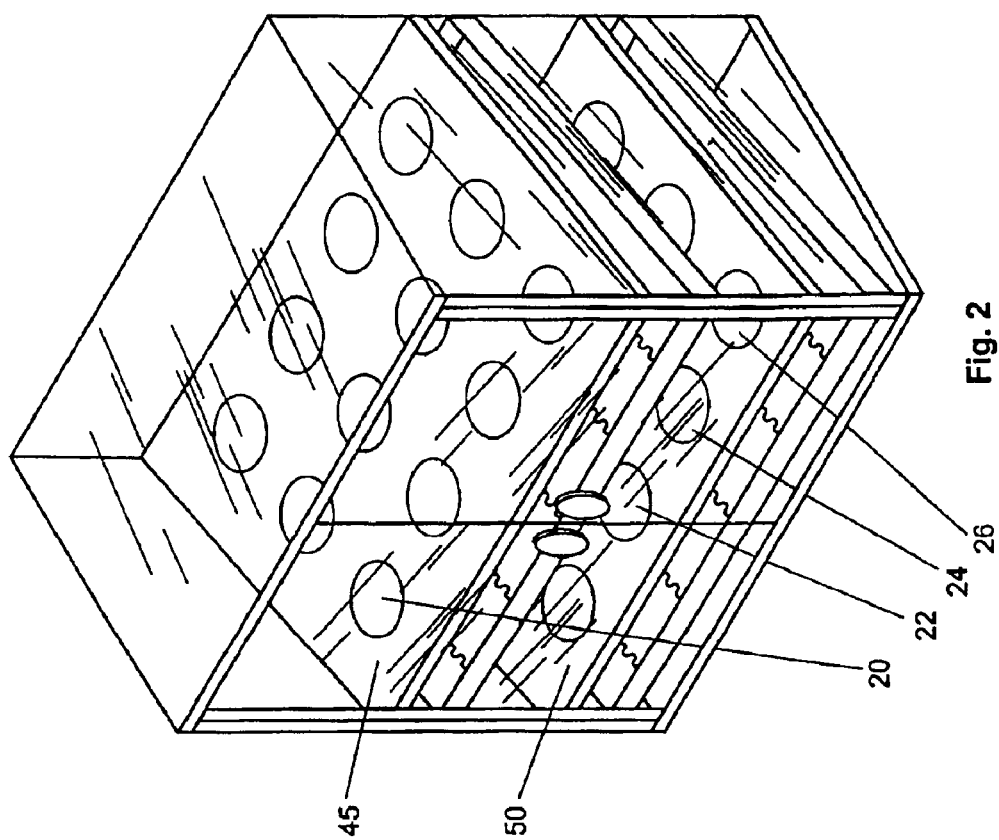
FIG. 2 illustrates a modular merchandiser system having a merchandiser and a warming compartment according to the invention.
Figure 2A:
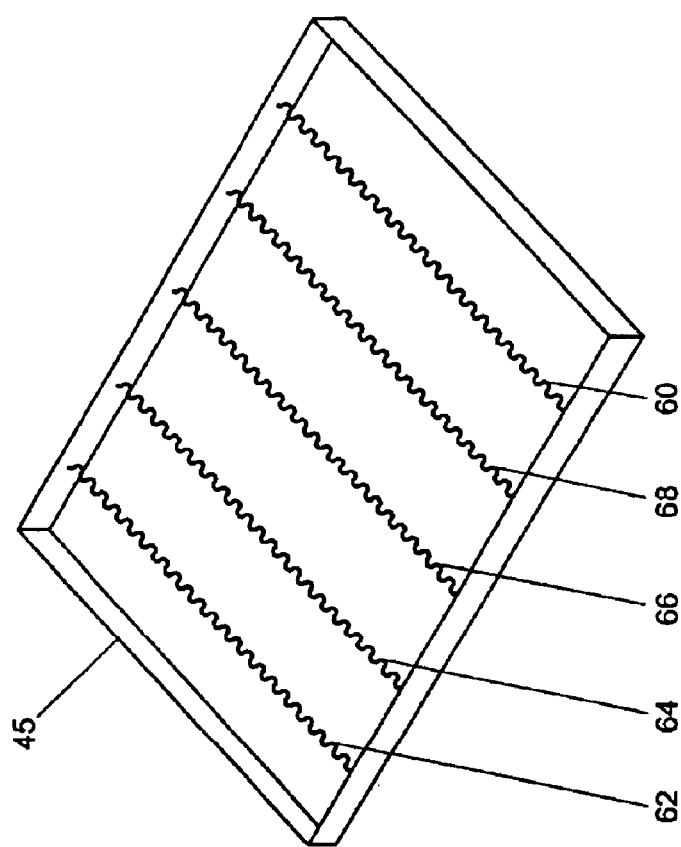
FIG. 2A, shows a cutaway of the support surface 45 in FIG. 2 used in a conduction-type merchandiser.

In two additional embodiments, the heat source includes heating coils disposed above or under the baked products. In either embodiment, the coils are preferably uniformly disposed to provide a symmetrical, and therefore even, heat pattern to the baked products. FIG. 2 shows coil(s) disposed under the baked products 20, 22, 24, 26 inside the mounting structure(s) or support surface(s) 45, 50. FIG. 2A, a cutaway of the support surface 45 in FIG. 2, shows the coils 60, 62, 64, 66, 68. There is preferably an air gap between the top of the heating coil(s) and the surface on which the baked products are disposed. The air gap can be about 0.5 inch to 1 inch between the heating elements 60, 62, 64, 66, 68 and the baked products on the support surface. In another embodiment that is not as preferred, rings or other flexible heating devices can be embedded within the support surface itself. This permits the shape of the heating device to match the shape of the baked product, e.g., round or rectangular, to heat just the baked product without excess heating. While the trays are designed to support the bottom surfaces of the baked products, stacking may incorrectly position the products on the trays. When the trays are designed with only partially heated areas, some products may not be properly heated and warmed. Thus, convection heating is preferred in these instances. In fact, in a preferred embodiment of the invention, it is generally preferred that substantially all of the heating of air in the enclosure occurs by indirect convection heating of the air to minimize or avoid direct radiative or conductive heating of the baked products.

The convection heating of the baked products in the enclosure of the merchandiser preferably has the following parameters, although any suitable parameters are acceptable so long as drying is controlled to provide fresh baked organoleptic characteristics to baked products over time. The Reynolds No. of airflow in the enclosure is preferably below about 2300 to avoid significant turbulent mass transfer leading to unacceptable moisture loss. Preferably, the Reynolds No. is from about 1150 to 2300. For baked products about 10 cm across (i.e., 4 inches), the preferred air velocity in the enclosure is about 0.1 m/s to 1 m/s to facilitate convection heating while controlling drying. In a more preferred embodiment, the air velocity in the enclosure is about 0.2 m/s to 0.5 m/s (about 40 fpm to 100 fpm). Thus, if heat convection does not generate such air velocity, one or more fans, pumps, or other well known devices can be included in the device to ensure suitable air velocity. These parameters are generally suitable for both filled and non-filled baked dough products, although minor variations may be required.

The merchandiser typically controls the drying of the baked product so as to retain a sufficient moisture profile that is desirable to consumers. For certain products, an outer portion of the product has a lower moisture content while a central or inner portion has a higher moisture content. In a preferred embodiment, for a round-type baked product having an overall diameter of about 5 to 12.5 cm (2 to 5 inches), the central zone of the baked product can be understood to have a width of about 2 to 3 cm (about ¾ to 1¼ inch) while the outer zone can be understood to have a diameter of about 0.6 to 1.6 cm (¼ to ¾ inch) measured from the perimeter of the round baked product, such as a cookie.

For a baked cookie of this type, a desired moisture profile over time can refer to a moisture loss of about 15 percent to 70 percent, preferably about 30 percent to 60 percent, of the moisture from the outer zone of the baked product over at least about 6 hours. For the central zone of this embodiment, the moisture loss is less than about 20 percent, preferably less than about 15 percent, and more preferably less than about 10 percent, over at least about 6 hours. This controlled drying provides an outer zone of a baked product that becomes somewhat drier and crispier, while retaining a relatively moister, chewier central zone that provides desired organoleptic and/or texture characteristics.

In a preferred embodiment when the baked product includes chocolate or peanut butter chips or similar inclusions, such as in cookies or brownies, the baked product retains sufficient "chocolate pull" to provide a desired appearance and texture to the consumer. Chocolate pull is well understood by those of ordinary skill in the art to refer to the capacity of certain types of chocolate to be sufficiently viscous to create a bridge of chocolate when a baked product is pulled apart at the point where a chocolate chip is located but not so viscous as to resist pulling. Chips that are too heated become molten and chips not heated enough are too solid to pull apart. Those chips that exhibit chocolate pull are being maintained at essentially the correct temperature.

Another manner of measuring the desired moisture profile is with respect to the firmness of the baked product as time progresses. The crisp/soft boundary when warming a rounded, previously baked product moves inward over time at a controlled rate as moisture migrates out of the baked product in an apparatus of the invention. On the contrary, the crisp/soft boundary is typically at the edge of the rounded product when the product is merely placed under ambient conditions, since the moisture equilibrates over the entire baked product. Conventional warming devices will move the crisp/soft boundary far too quickly to the central portion of the baked product, resulting in an undesirable product. The firmness of baked products, which helps determine the crisp/soft boundary, can be measured using texture analyzer model TA-XT2 commercially available from Stable Micro Systems of Godalming, Surrey, England. The device typically can be used with four to six prongs to determine firmness, or stress, in a baked product warmed in an apparatus of the invention. The stress on previously baked cookies warmed in an apparatus of the invention can be as follows: for the outer zone, the stress is typically at least about 50 g/mm$^2$ after one hour of warming and at least about 150 g/mm$^2$, preferably at least about 200 g/mm$^2$ after 6 hours of warming; the central zone has a stress of less than about 25 g/mm$^2$ after one hour and less than about 45 g/mm$^2$ after 6 hours of warming. Preferably, the stress is about 3 to 5 times greater at the outer zone compared to the center zone after one hour of warming and about 5 to 7 times greater after six hours of warming.

In one embodiment, the merchandiser can be used to warm different types of baked products, such as two of filled pastry dough products, cookies, brownies, muffins, croissants, danish, and the like. When cookies are selected, it is typically desired for the cookies to have a different moisture profile than the other types of baked goods. Thus, cookies or other products in which a dual texture is desired can be placed on one support surface, i.e., a first shelf, and the other product(s) can be placed on a second support surface, i.e., a second shelf. When a more uniform moisture profile instead of one with a sharper gradient is desired, such as for the brownies, a cover can be at least partially placed over the baked products to avoid contact with the heated air flowing throughout the chamber (either from a fan or as a result of convection currents that will naturally arise due to heating). The cover is preferably one that has a low profile so as to minimize the effect on the convective currents within the merchandiser. Thus, the cover should just clear the top of the single-texture products being warmed, e.g., for brownies a cover of about 1 inch in height should be suitable. The cover acts to trap moisture within the cover and to inhibit or avoid the drying that would otherwise occur at the edges of the brownies or other baked products. The cover can be porous, i.e., have one or more apertures therein, if some moisture loss is desired or can be entirely sealed if minimizing the moisture loss is desired.

When it is desired to provide controlled drying in a previously baked dough product, the product should be kept chilled, or preferably frozen, until shortly prior to being placed in the merchandiser of the invention. "Shortly prior" generally means less than about 2 hours, preferably no more than about 1 hour, and more preferably the baked dough product is pulled from the freezer and promptly placed in the merchandiser, optionally and preferably just after being thawed and warmed in an oven, e.g., for up to about 10 minutes, or a microwave, e.g., for up to about 2 minutes. Preferably, the baked dough products in which a dual texture and controlled drying are desired should not be thawed until they become too soft, particularly under ambient conditions, as the moisture would tend to equilibrate, and consequently, the fresh baked moisture profile would not be sufficiently provided during warming in the merchandiser.

In one embodiment, the apparatus can be constructed with the following dimensions. A preferred size can be from about 10 to 15 inches wide and about 10 to 15 inches deep, with each dimension being independently selected. A particularly suitable enclosure height is from about 15 to 30 inches (not including the housing over the walls, which must be sufficiently large to house the heating system). In one preferred embodiment, the total height of the merchandiser is 26 inches, with the height of the enclosure measuring 16.25 inches, and the height of the bottom insulation layer measuring 1 inch in thickness. The smaller size of the merchandiser allows it to occupy less counter space, without sacrificing its storage capacity. In one embodiment, a merchandiser that is 13.5 inches square can hold about 27 3.5 inch-diameter cookies easily on three support surfaces. The heating system is designed to heat the enclosure to a temperature from about 90° F. to 180° F., preferably from about 140° F. to 180° F., more preferably from about 155° F. to 180° F. In varying embodiments typically used for unfilled baked products, the equipment is designed to achieve a desired enclosure temperature of about 110° F. to 115° F., about 115° F. to 120° F., about 120° F. to 125° F., and about 125° F. to 130° F. In other embodiments typically used for filled baked products, particularly those containing meat, fish, chicken, or cheese in the fillings, enclosure temperatures of about 145° F. to 155° F., about 160° F. to 170° F., and 175° F. to 180° F. can be achieved.

The temperature in the enclosure is preferably controlled to remain substantially constant or entirely constant. Preferably, the temperature remains at least substantially the same at every point throughout the entire enclosure, which is a result of the controlled air circulation, the size and shape of the enclosure, the appropriate insulation of the enclosure, the size and shape of the support member and even the baked products therein. To control the temperature to be substantially constant over time, any suitable device to control the temperature can be employed, such as a conventional bimetallic spring loaded thermostat coupled with an operator controlled temperature gauge (controller). This system typically provides a temperature that remains within about 12° F., preferably about 10° F., more preferably about 6° F. of the desired fixed temperature, i.e., above or below the set temperature. Some conventional systems are only able to achieve a temperature within 15° F. of the desired temperature, while others have wide temperature variations at different locations in the enclosure due to substantial direct conductive or radiative heat. Preferably, however, the temperature range of the present invention is more constant than this variation, and it is preferred that temperature variations are less than about 10° F. at enclosure temperatures of 180° F. Particularly preferred temperature controlling devices include the "electronic controller" types, which include those commercially available from Oven Industries and from Churchill Engineering, each of which will more precisely control the heat to within 4° F., preferably even within 2° F., above or below the desired temperature. Proportional controllers regulate the electric power based on a signal that is proportional to the differential of sensor temperature from the set point and they are typically integrated with the solid state rectifier to provide more constant temperatures when substantially constant temperature is important. In one preferred embodiment, the thermometer used in conjunction with the rectifier and either type of controller is disposed adjacent to a wall having no aperture therein. The thermometer is also preferably disposed sufficiently far from the heat source and the aperture(s) to avoid having the readings inaccurately altered, i.e., the thermometer is preferably not next to a heating coil or light bulb.

Figure 3:
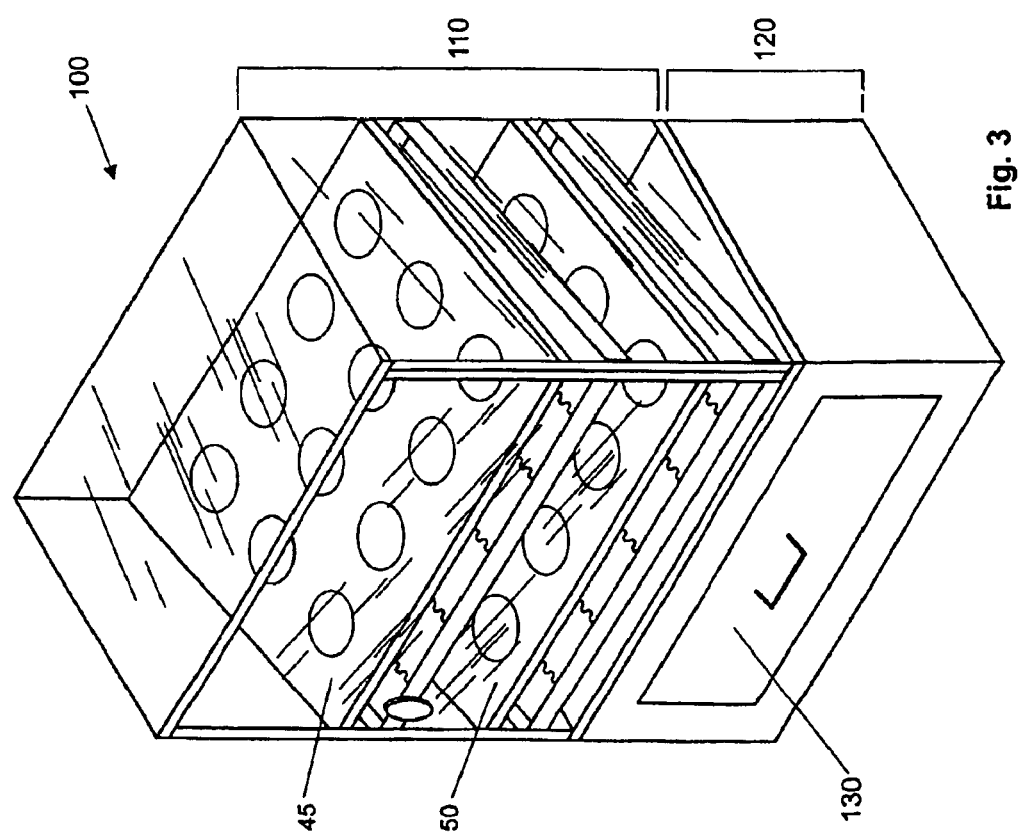
FIG. 3 shows a modular merchandiser system having a merchandiser and a warming compartment according to the invention.

The invention also includes a merchandising system 100 depicted in FIG. 3 that includes a modular device 100 wherein the merchandiser 110 described above is packaged with a warming compartment 120 with a higher temperature than the merchandiser 110. It should be understood that the merchandiser 110 warms frozen baked products for a sufficient period of time to provide a suitable dual texture and are suitable for consumption. For certain products, this will be for about 2 to 20 minutes, while in others it will be over about 30 to 60 minutes, and it is well known these numbers can be varied by the temperature of pre-heating the frozen products. In this modular system, frozen cookies previously baked can be thawed and rapidly warmed in the warming compartment 120 in less than about 10 minutes, preferably less than about 5 minutes, and more preferably in about 1 to 3 minutes to permit more rapid sales of baked products and replenishment thereof. The warming compartment 120 is preferably sized and configured to receive the same size support surface 45, 50 used in the merchandiser 110 as described herein. For example, the warming compartment 120 can be one or more slots or drawers 130 into which the trays or sheets 45, 50 can be inserted for rapid thawing.

The baked products can be disposed on a support surface that is easily placed in the warming compartment for sufficient time to begin the warming but insufficient for the desired moisture gradient in the baked products to be destroyed. Once sufficient warming has occurred, the support surface can be removed from the warming compartment and placed in the merchandiser to be slowly warmed for display, sale, and consumption. Preferably, the merchandising system is arranged so that the merchandiser is disposed over the warming compartment to keep the merchandiser readily accessible to consumers. This embodiment conveniently avoids the need for a separate oven to rapidly warm frozen baked products such as cookies in case there is huge demand, avoids the need to transport the baked products from another area in the kitchen where an oven might be located, avoids the need to tie up oven space or time or to alter the oven settings from other typical uses, can be used in a retail or convenience store where an oven is not feasible from an economic, electricity, space, or other standpoint.

The warming compartment is typically operated at a temperature of about 275° F. to 500° F., preferably from about 300° F. to 475° F., and in one embodiment this is accomplished by convection heating. In a preferred embodiment, the warming compartment can operate from about 350° F. to 425° F. The warming compartment can include a controller for automatic cycling so that the compartment will automatically open and eject the support surface of thawed, baked goods when the heating cycle is complete. This avoids overdrying, as well as aids the clerk operating the equipment. Alternatively, an alarm can be set to automatically ring or buzz when the heating cycle is over. Another benefit of the merchandising system is that heat from the warming compartment can be arranged so that it will rise and assist in maintaining the temperature of the merchandising compartment above, which further reduces energy costs of running the system.

Placing frozen baked products in the merchandiser typically requires a short wait, e.g., 15 minutes, 30 minutes, 60 minutes, or the like, before the baked products are sufficiently thawed and have their fresh-baked characteristics to be ready for consumption. When products are first rapidly thawed in the warming compartment, they can be moved into the merchandiser for display and sale. If warmed properly, the warming compartment can speed the baked products' preparation so they are ready for consumption with a proper fresh-baked moisture profile after a much shorter time in the merchandiser.

For convenience, both the merchandiser and the warming compartment are configured to receive the same size trays. These trays can be used to initially support the frozen products before warming and then can support the baked products in the merchandiser. Thus, the products can be placed on the trays, warmed in the warming compartment and the trays can then simply be relocated to the merchandiser.

For products that can be thawed or warmed by microwave, and then provided with the desired moisture profile in the merchandiser, it is preferred that the enclosure and housing be used without a warming compartment and that a microwave be used in conjunction with the merchandiser to provide the initial thawing or warming. For example, filled pastry products can be microwaved to rapidly thaw or warm the products, and although they are typically soggy they can be disposed in the merchandiser. After a sufficient time in the merchandiser, the proper dual texture will form in each baked product so as to provide an outer crust that is crispier and more dry, and a center portion that is relatively more moist. Since microwaved products typically include some moisture for effective heating, this moisture tends to migrate outwards during microwaving and often causes a soggy outer portion to previously baked products.

Figure 4:
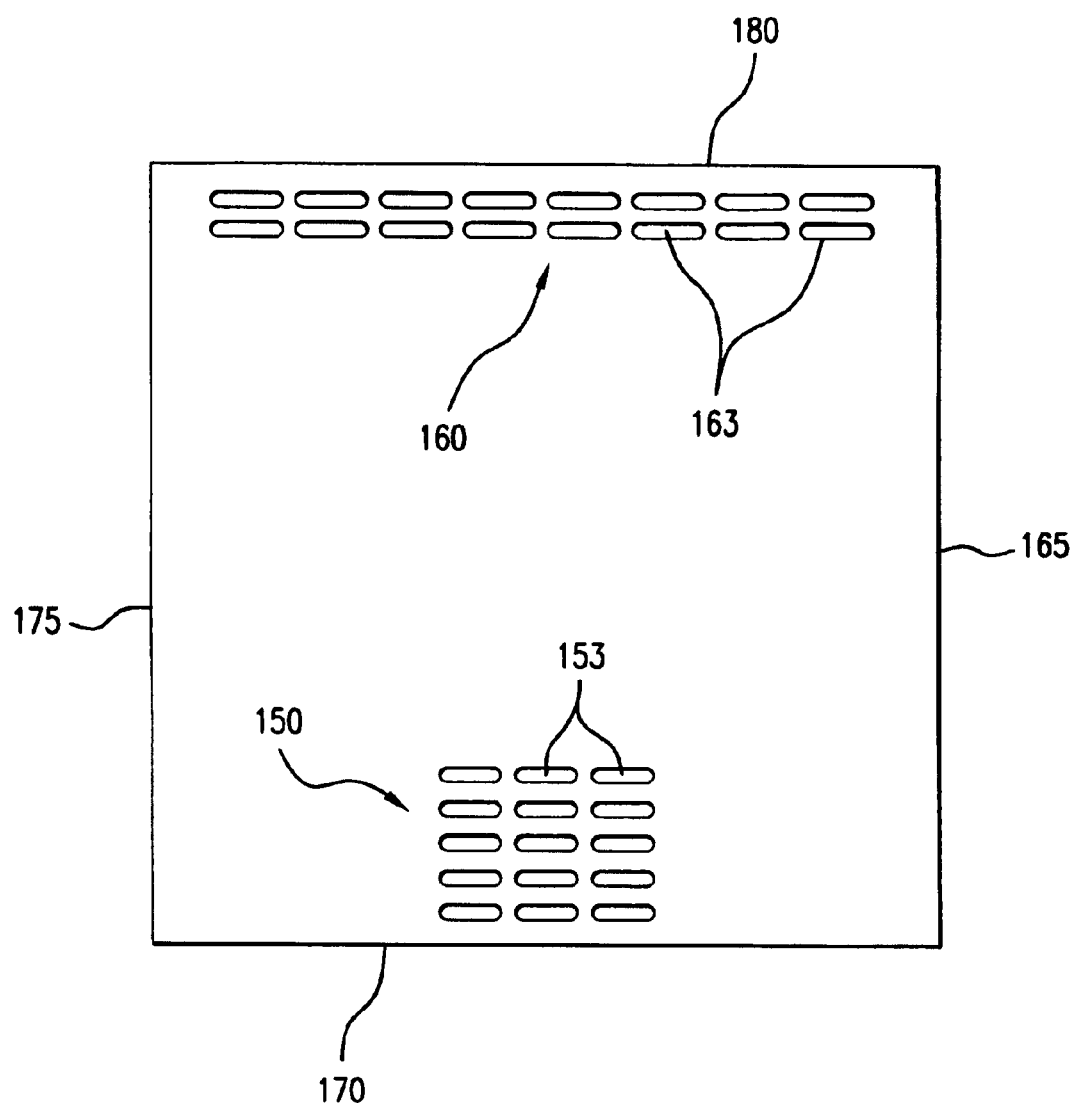
FIG. 4 illustrates a bottom view of the zone where an inlet and an outlet of the heating system interact with the enclosure according to the invention.

FIG. 4 shows a bottom view of the zone where an inlet and an outlet of the heating system interact with the enclosure according to the invention. In this embodiment, the position of the inlet 150 and the outlet 160 of a heating system can be seen to include a plurality of elongated, capsule shaped apertures 153, 163. These terms "inlet" and "outlet" are used with respect to the heating system, so the inlet 150 is used to pull air from the enclosure into the heating system, and the outlet 160 outputs air back into the enclosure. In an exemplary merchandiser, the wall members 165, 170 measure 350 mm in height and length, respectively. An initial row of inlet and outlet apertures 153, 163 of the inlet 150 and outlet 160 are spaced 10 mm away from the wall members 170, 180 respectively. The outlet apertures are also spaced at least 25 mm away from wall member 165 and opposing wall member 175. Extra rows of apertures are included to the inlet 150 and outlet 160 as shown. For example, in FIG. 4, two rows of apertures are present in the outlet 160 of the heating system. The two rows together are disposed approximately 25 mm across in the direction from wall members 170 and 180. Each row is disposed 300 mm end-to-end in the direction from wall members 165 and 175. Similarly, FIG. 4 shows the inlet including multiple rows of apertures. Here, the five rows of inlet apertures 153 are disposed 68 mm across from wall members 170 and 180. Each row of inlet apertures 153 is disposed 96 mm end-to-end across in the direction from wall members 165 and 175. The inlet 150 is desirably centered along the length of wall member 170.

Figure 5:
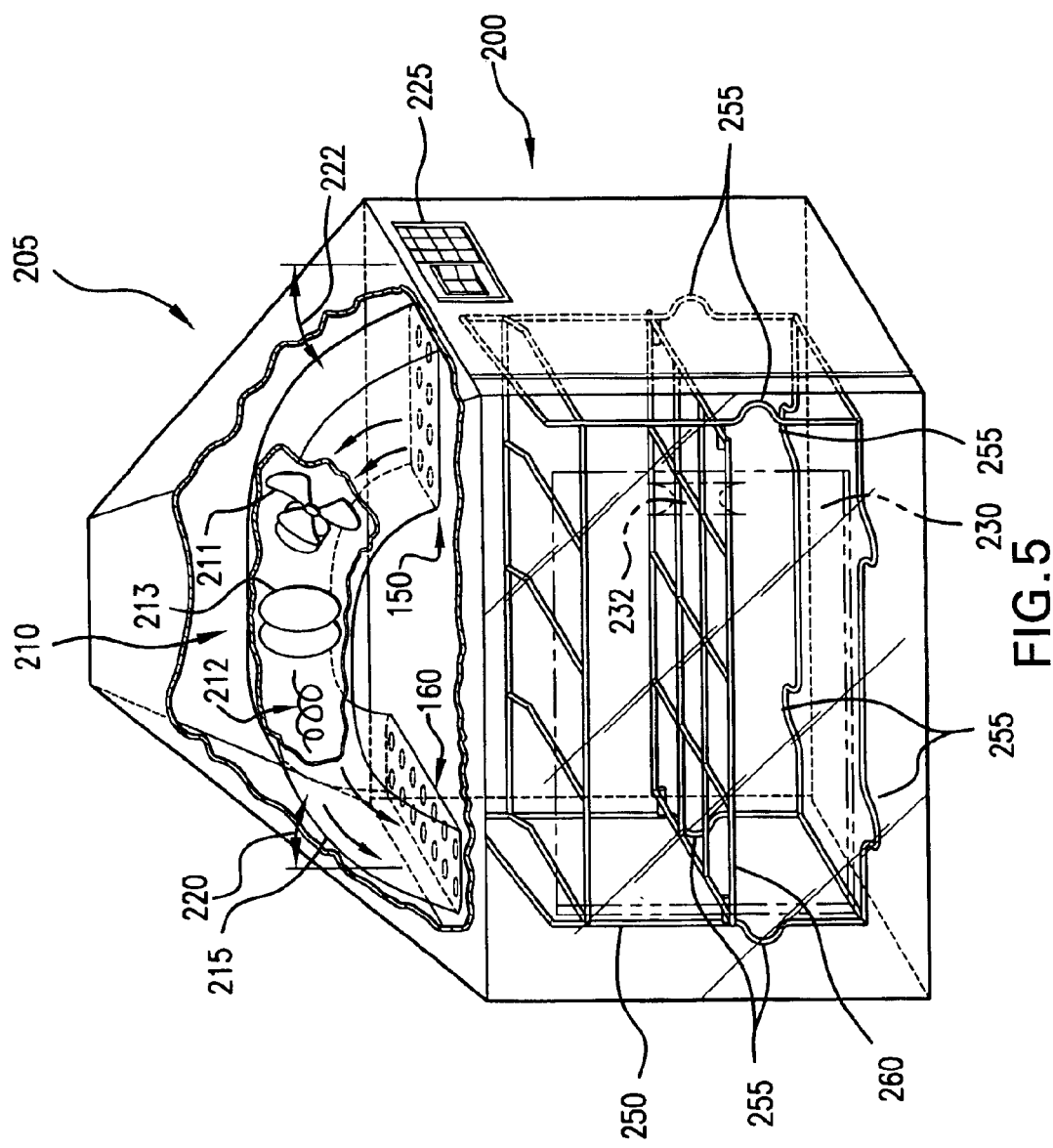
FIG. 5 shows a more detailed view of a merchandiser according to the invention.

FIG. 5 shows a more detailed view of one embodiment of a merchandiser according to the invention that includes an enclosure 200 above which is disposed a housing 205 for the heating system 210. The heating system 210 includes an air-moving device 211 that is a fan, a heat source 212 that is a heating coil, and a reflective device 213 that includes two adjacent reflective disks shaped to fit the conduit 215 in which the heating system 210 is disposed. The arrows indicate the direction of air flow, showing the inlet 150 from the enclosure 200 and the outlet 160 that directs heated air back to the enclosure 200. Preferably, at least one of the inlet and outlet are adjacent to the aperture 230 and the air flow enters the enclosure 200 above the aperture. Alternatively, the air flow enters adjacent the wall member opposite the aperture 230, or adjacent a second aperture (not shown) opposite the aperture 230. FIG. 5 illustrates the heating system 205 in an arrangement that is essentially perpendicular to the preferred embodiment to facilitate depiction of the features therein. The heating system 205 is beneficially directed at an angle 220, 222 from the adjacent vertical wall member. Different angles 220, 222 can be used on either side, but the more important angle 220 is at the outlet 160 to ensure air is properly directed back into the enclosure 200 to facilitate controlled drying of the products therein. The heating system 210 is typically entirely contained within the housing 205 to minimize injury by operators or customers taking baked products, as well as for visual appeal and to permit space on one or more parts of the housing 205 for an advertising insert (not shown) for the products in the enclosure 200. The heating system 210 is operatively associated with the temperature control system 225 at the user interface to facilitate setting the temperature in the enclosure.

FIG. 5 depicts an opening or door 230 having a handle 232 sized and configured to receive an oven mitt so baked products can be removed from or provided into the interior space of the enclosure 200. The enclosure 200 contains the support member 250, a portion of which is shown here as a wire rack having a positioning arrangement of the invention. The positioning arrangement shown includes a plurality of spacing devices 255 in the form of integrally formed protrusions of the wire rack in various locations to facilitate reproducibly positioning the support member 250 in the enclosure 200 if it is removed for cleaning, reloading of baked products, or any other suitable reason. The support member 250 also typically includes a plurality of support surfaces 260 upon which baked products (not shown) are disposed for controlled drying and simultaneously for display to consumers. Importantly, the outlet 160 from the heating system 210 is preferably sized and configured to at least substantially correspond to the gap between the wall member of the enclosure 200 and the support member 250 to facilitate controlled drying. Only a single support surface 260 is depicted, although preferably two or three support surfaces 260 spaced in the direction of the housing 205 are typically included during operation. Although not required, these support surfaces 260 typically correspond to the shape of the support member 250, which itself typically corresponds to the shape of the enclosure 200. The support surface(s) can be integrally formed with, or releasably mounted, in any suitable manner on the support member, such as by resting on protrusions or substantially horizontally directed cross-pieces or wires, sliding into grooves or slots, or the like. A second larger opening (not shown) can be included on the wall member opposite the opening 230 to facilitate removal and replacement of the entire support member 250, one or more support surfaces 260, baked products (not shown), or a combination thereof.

Figure 6:
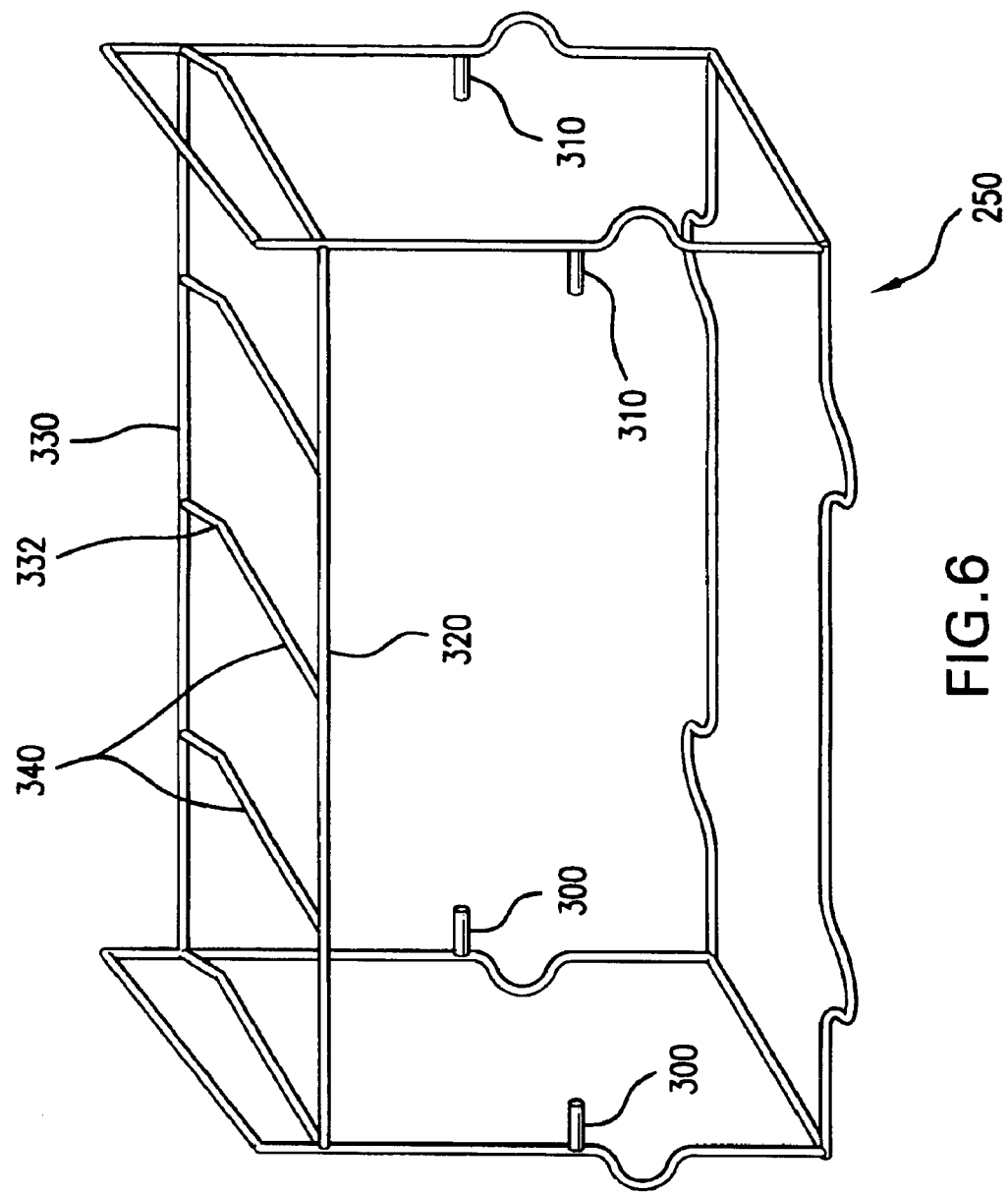
FIG. 6 shows a support member including a mounting structure for support surfaces according to the invention.

FIG. 6 shows a support member 250 of the invention that is operatively associated with a mounting structure to receive support surface(s) (not shown). The mounting structure depicted includes posts 300, 310 at each corner of the support member 250 that are adapted to receive a support surface. Each pair of posts 300, 310 can optionally, but preferably, be connected to form a support bar 320, 330 extending across support member 250, as shown for a second support surface. A plurality of cross-pieces 340, can optionally but preferably be included that extend across the support member 250 to connect separate support bars 320, 330. Preferably, the support surface substantially or entirely covers, and more preferably even matches the shape, of the cross-pieces 340 and extended posts 320, 330. An exemplary support surface can be shaped like a "Z" in cross-section so that one recess receives bar 320 and the other end of the "Z" rests at a lowermost point 332 adjacent bar 330. Opposing pairs of posts 300, 310 or support bars 320, 330 can stabilize each support surface in position, and a desired number of sets of either can be included for each support surface. The posts 300, 310, support bars 320, 330, or other suitable mounting structure components can be movable and fixable at desired heights depending on the number of support surfaces to be included. Each support surface can simply rest on top of a corresponding mounting structure, or the support surface can include a recess to receive and position the support surface as it is placed on its corresponding mounting structure.

The invention can also include a set of instructions, and methods, of heating and then warming baked products under controlled drying conditions in the apparatus of the invention. Suitable instructions and methods for filled pastry products include the step of microwaving a desired number of baked products for about 20 to 120 seconds, preferably for about 30 to 70 seconds. This thaws the products, which can then be disposed into the merchandiser for a short time to generate or reestablish a moisture gradient with a crisper, drier outer portion compared to a center portion. The products are then suitable for serving and have the desired fresh-baked organoleptic character.

EXAMPLES

The invention is further illustrated, but not limited, in the following working examples, where all percentages and parts are by weight.

Example 1

A Prior Art Thaw and Serve Cookie

Cookies having a 4 inch diameter were previously baked and frozen. These cookies were thawed under ambient conditions and the moisture content measured over time at the outer zone, central zone, and an intermediate zone therebetween.

| Moisture Content (%) | Edge Zone | Intermediate Zone | Central Zone |
| --- | --- | --- | --- |
| After 1 hour | 5.8% | 6.9% | 8.5% |
| After 3 hours | 5.8% | 8.1% | 8.4% |
| After 6 hours | 5.4% | 7% | 8.1% |

As demonstrated, the cookies according to the prior art have an insufficient drying, or moisture loss, from the outer zone. Thus, cookies merely thawed and served after having equilibrated with ambient conditions do not have the most desired moisture profile.

Example 2

A Prior Art Apparatus Using a Wire Rack

Cookies having a 4 inch diameter were previously baked and frozen. These cookies were placed on an open wire rack in a conventional apparatus used to warm and display cookies. The wire rack had approximately a 78 percent open area between wires. The moisture content of the cookies was measured over time at the outer zone, central zone, and an intermediate zone therebetween, using the same zones as for Example 1.

| Moisture Content (%) | Edge Zone | Intermediate Zone | Central Zone |
|---|---|---|---|
| After 1 hour | 4.2% | 6.7% | 8.6% |
| After 3 hours | 4.2% | 5.7% | 7.6% |
| After 6 hours | 2% | 4.5% | 7% |

As demonstrated, frozen cookies warmed by a prior art apparatus have too much drying, or moisture loss, from the central zone. The outer zone has lost a significant, but acceptable, amount of moisture over 6 hours. Thus, cookies warmed in a device that does not sufficiently contact and protect the previously baked products being warmed did not have a desired moisture profile.

Example 3

A Cookie Prepared According to a First Embodiment of the Invention

Cookies having a 4 inch diameter were previously baked and frozen. These cookies were placed on a solid tray in an apparatus according to the invention used to warm and display the cookies. The solid tray had 0 percent open area and the apparatus employed a resistance heating element (e.g., Calrod) for heating with no direct line of sight to the cookies. Thus, the apparatus employed a fan to provide indirect heating by blowing the air warmed by the lamps over and about the cookies. The moisture content of the cookies was measured over time at the outer zone, central zone, and an intermediate zone therebetween, using the same definitions of these zones as for Example 1.

| Moisture Content (%) | Edge Zone | Intermediate Zone | Central Zone |
|---|---|---|---|
| After 1 hour | 5% | 6.8% | 8.5% |
| After 3 hours | 3.5% | 6% | 8.5% |
| After 6 hours | 2.6% | 5% | 8.3% |

Using the inventive apparatus provided a desired moisture profile in the baked products even up to 6 hours. The outer zone lost sufficient moisture to provide a crispy, drier edge and the central zone retained sufficient moisture to provide a chewy, moister center.

Example 4

A Cookie Prepared According to a Second Embodiment of the Invention

Cookies having a 4 inch diameter were previously baked and frozen. These cookies were placed on a solid tray in another apparatus according to the invention used to warm and display the cookies. The solid tray had 0 percent open area and the apparatus employed convection heating below the tray to warm the cookies. A small air gap was provided between the conduction heating coils and the tray to facilitate more uniform heating of the underside of the tray on which the cookies were disposed. No fan was used. The moisture content of the cookies was measured over time at the outer zone, central zone, and an intermediate zone therebetween, using the same definitions of these zones as for Example 1.

| Moisture Content (%) | Edge Zone | Intermediate Zone | Central Zone |
|---|---|---|---|
| After 1 hour | 4.9% | 6.3% | 8.8% |
| After 3 hours | 3.5% | 5.9% | 8.9% |
| After 6 hours | 2.8% | 5.6% | 8% |

As demonstrated, this second apparatus according to the invention provided a desired moisture profile in the baked products even up to 6 hours. Again, the outer zone lost sufficient moisture to provide a crispy, drier edge and the central zone retained sufficient moisture to provide a chewy, moist center.

Example 5

Comparative Test of Moisture Loss

Figure 7:
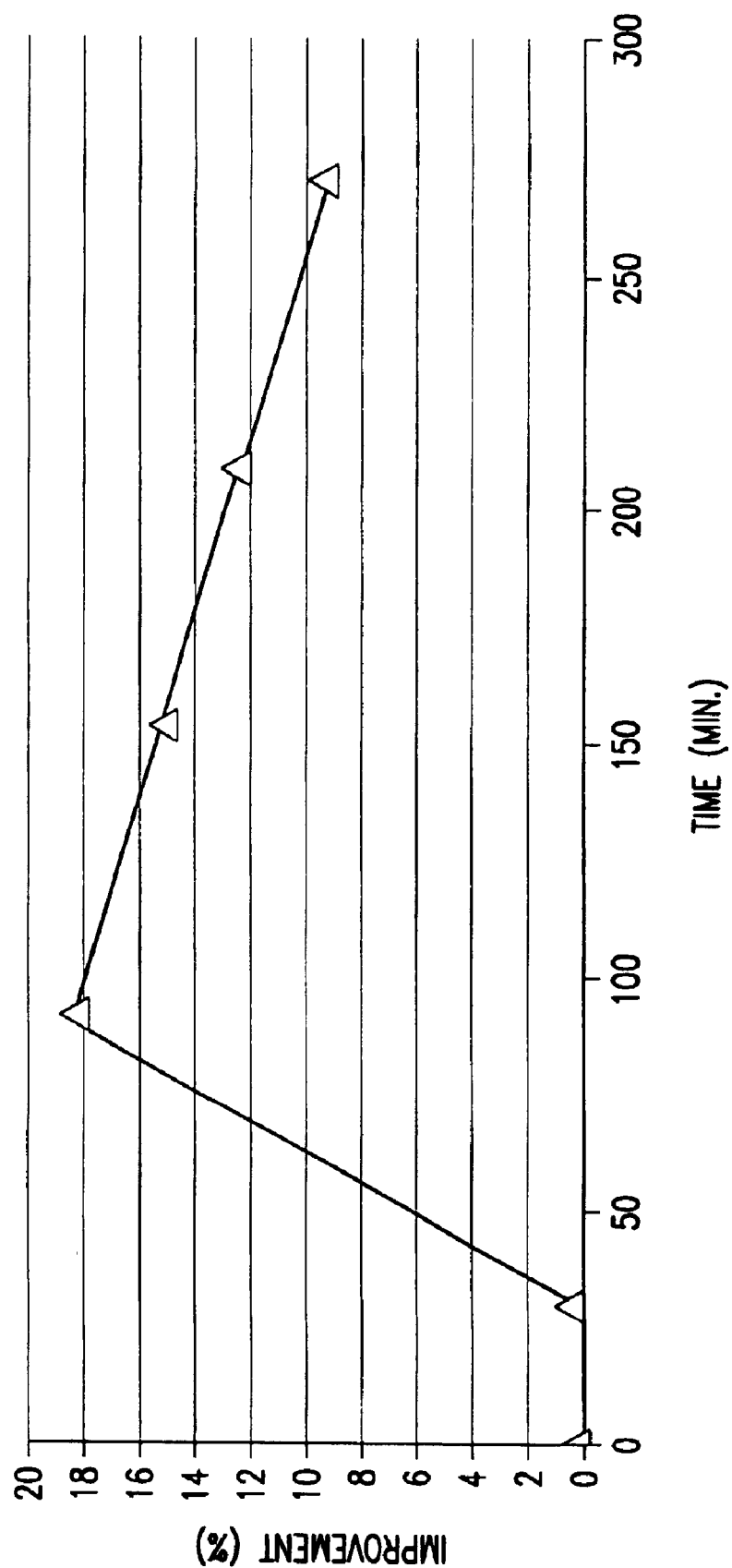
FIG. 7 illustrates an empirical comparison of the improvement in moisture loss of the present apparatus compared to a conventional apparatus.

A plurality of prebaked, filled pastry products were placed in an apparatus designed according to the present invention, and the same type of products were placed in a conventional merchandiser. FIG. 7 specifically demonstrates that the percentage improvement in reduced moisture loss of the present apparatus compared to that of the conventional apparatus provides a surprising and unexpected benefit in the controlled drying of previously baked products being warmed in the enclosure over several hours. Moreover, FIG. 7 demonstrates that significantly more moisture loss of baked products occurred over time in the conventional merchandiser compared to the controlled drying of baked products in an apparatus of the present invention.

The term "about," as used herein, should generally be understood to refer to both numbers in a range of numerals. Moreover, all numerical ranges herein should be understood to include each whole integer within the range.

In some embodiments where the term "substantially" is used, that term is generally defined to mean at least about 90 percent of the value referred to, preferably at least about 95 percent of the value referred to, and more preferably at least about 99 percent of the value referred to. Correspondingly, the value will not be more than about 110 percent of the value, preferably less than about 115 percent of the value, and more preferably less than about 101 percent of the value. Thus, for example, if the temperature is 95° F. and is "substantially uniform" it will be not less than about 90 percent or more than about 110 percent of that temperature.

The term "baked," as used herein, refers to a dough product cooked to some degree to create a moisture gradient therein.

It is to be understood that the invention is not to be limited to the exact configuration as illustrated and described herein. For example, it should be apparent that a variety of materials would be suitable for use in the composition or method of making the invention according to the Detailed Description. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A merchandiser for displaying and warming previously baked dough products under controlled drying conditions, comprising:

an enclosure having one or more wall members that define an interior space, with at least a portion of one of the wall members being transparent;

at least one opening for access into the interior space;
a removable support member within the enclosure that includes at least one support surface for previously baked dough products and a spacing arrangement configured and adapted to reproducibly position the support member within the interior space of the enclosure member, wherein the spacing arrangement is operatively associated with the support member and at least one wall member to provide sufficient spacing between the support member and the at least one wall member to facilitate substantially uniform airflow around each support surface and throughout the enclosure; and
a heating system for providing heated air in the enclosure, wherein the substantially uniform airflow provides controlled drying of the previously baked dough products in the enclosure.

2. The merchandiser of claim 1, wherein the enclosure has four wall members arranged in a generally rectangular configuration and the support member includes a frame.

3. The merchandiser of claim 2, wherein the frame has a generally rectangular configuration with sides that correlate to the wall members, and the spacing arrangement includes spacing members that are present on each side of the frame.

4. The merchandiser of claim 3, wherein the frame comprises a wire rack configured and dimensioned to minimize interruption of airflow within the enclosure, and the spacing members comprise portions of the wire rack that extends toward the wall members to position the wire rack at a substantially central location in the enclosure so as to provide an air gap on each side of the frame.

5. The merchandiser of claim 4, wherein one of the wall members includes a door for closing the opening, and the wire rack and spacing members are configured and dimensioned to allow positioning of the frame in the enclosure in at least a first position where the support surface(s) are angled downward to face the door and a second position where the support surface(s) face away from the door and are angled downward to face an optional second door opposite from the door.

6. The merchandiser of claim 5, wherein each door is held in a closed position by magnetic force and includes a handle that is sufficiently large to be grasped by an insulating hot pad when the door is to be opened to gain access to the baked products in the enclosure.

7. The merchandiser of claim 1, wherein the support member includes two or three support surfaces, and the enclosure comprises an insulation layer located beneath a bottom wall of the enclosure to inhibit or prevent heat loss from the enclosure.

8. The merchandiser of claim 1, further comprising a mounting structure associated with the support member for mounting and positioning each support surface at a user accessible location and wherein each support surface is part of a tray that includes a lip extension to inhibit or prevent baked products from sliding off the support surface and is removably mounted upon the support member to facilitate removal for product placement thereon or cleaning thereof.

9. The merchandiser of claim 1, wherein the enclosure further comprises one or more lights to illuminate a portion of the baked products in the enclosure in a manner that does not generate an amount of heat that substantially affects the controlled drying of baked products that are exposed to the light(s).

10. The merchandiser of claim 1, wherein the heating system operates to maintain the interior space of the enclosure at a temperature of about 90° F. to about 180° F. and the baked product retains its organoleptic properties for a period of at least about 4 hours and is located sufficiently remote from the baked products and each support surface, such that direct contact or radiative heating of the products on each support surface by the heating system is at least substantially avoided.

11. The merchandiser of claim 10, wherein the heating system comprises a heat source sufficient to heat the enclosure to provide controlled drying of the baked products therein, an air-moving device sufficient to circulate heat from the heat source through the enclosure, and a reflective member positioned near the air-moving device to inhibit or prevent overheating of the air-moving device from heat generated from the heat source.

12. The merchandiser of claim 11, wherein the enclosure includes a front wall, a pair of side walls, and a rear wall with the front and rear walls being disposed between the side walls, and a housing structure that contains the heating system and that is disposed above each wall of the enclosure, so that the heating system is arranged to direct heated air downwardly into the enclosure and toward at least one wall of the enclosure at an angle of about 10 to 50° with respect to the wall.

13. The merchandiser of claim 12, wherein the housing structure includes:
an outlet configured and positioned to direct heated air into the enclosure; and
an inlet to receive air from the enclosure that requires additional heat from the heat source to maintain the controlled drying of the previously baked dough products in the enclosure, wherein the outlet from the heating system corresponds to a portion of the space between a support surface and at least one wall sufficiently to control the substantially uniform airflow and the drying of the products in the enclosure.

14. The merchandiser of claim 13, wherein the outlet directs the heated air to enter the enclosure at a distance of about 0.125 to 1.5 inches from one of the walls to facilitate convective flow of the heated air between the support member and the enclosure walls.

15. The merchandiser of claim 1, further comprising a temperature control system capable of maintaining the heated air at a temperature constant throughout the enclosure to within about 10° F. above or below a temperature that is selected based on the type of baked products to be placed in the merchandiser, wherein the enclosure comprises a heat-resistant thermoplastic component.

16. The merchandiser of claim 15, wherein the temperature is maintained at a constant to within about 5° F. above or below the selected temperature.

17. A merchandiser for displaying and warming previously baked dough products under controlled drying conditions, comprising:
an enclosure having one or more wall members that define an interior space, with at least a portion of one of the wall members being transparent;
at least one opening for access into the interior space:
a removable support member within the enclosure that includes at least one support surface for previously baked dough products and a spacing arrangement configured and adapted to reproducibly position the support member within the interior space of the enclosure member, to facilitate substantially uniform airflow around each support surface and throughout the enclosure;
a heating system for providing heated air in the enclosure, and a temperature control system capable of maintaining the heated air at a temperature constant throughout the enclosure to within about 10° F. above or below a temperature that is selected based on the type of baked products to be placed in the merchandiser, wherein the enclosure comprises a heat-resistant thermoplastic component, wherein the substantially uniform airflow provides controlled drying of the previously baked dough products in the enclosure, and wherein the temperature control system comprises a proportional controller having a control circuit and sensor signal that regulates electric power based on a signal that is proportional to the differential of sensed temperature and selected temperature, a solid state rectifier operatively associated with the control circuit and sensor signal to provide the selected temperature, and a digital interface so that a user may readily set or change the selected temperature based on the type of baked products that are to be introduced into the merchandiser.

18. The merchandiser of claim 17, wherein the digital interface of the temperature control system is located outside the enclosure either on or above a wall member adjacent to the at least one opening to facilitate setting of the selected temperature and automatically defaults to the selected temperature setting when turned on after a shut off period.

19. The merchandiser of claim 17, wherein the temperature control system includes at least one pre-programmed setting for a specific type of baked products, a plurality of pre-programmed settings for different types of baked products, or a memory device that automatically stores a manually set temperature and recalls the previously set temperature when the merchandiser is activated, or a combination thereof.

20. A method for displaying and warming previously baked dough products under controlled drying conditions in a merchandiser which comprises:

providing a temperature-controlled, heated enclosure defined by a plurality of walls;

circulating heated air within the enclosure at a rate that avoids overdrying the baked products over a period of at least about 2 hours; and supporting the previously baked dough products on a support member comprising at least one support surface within the enclosure;

wherein the heated air is forced into the enclosure from at least one air inlet through a spacing arrangement operatively associated with the support member and at least a first wall of the enclosure that is substantially perpendicular to the support surface to provide sufficient spacing between the support surface and the first wall, so that a substantially uniform heated airflow is provided around at least the support member to control the drying of the previously baked dough products in the enclosure.

21. The method of claim 20, wherein the at least one air inlet is provided adjacent the first wall of the enclosure and directs the flow of air exiting said inlet at a desired angle toward the first wall.

22. The method of claim 20, wherein at least one air outlet is provided to pull air from another space provided between the support surface and at least a second wall of the enclosure, said second wall being substantially perpendicular to the support surface and opposite to the first wall.

23. The method of claim 20, wherein a portion of the air flowing into the space further flows in a direction substantially perpendicular to the first wall and adjacent each support surface.

24. The method of claim 20, wherein the temperature-controlled, heated enclosure is maintained at a selected temperature of between 140° F. to 180° F. and within about 10° F. of the selected temperature.

25. The merchandiser of claim 1, wherein the spacing arrangement positions the support member about 0.125 inches to about 2 inches from the at least one wall member.

26. The method of claim 20, wherein the spacing arrangement positions the support member about 0.125 inches to about 2 inches from the first wall.

* * * * *